(12) United States Patent
Petersen et al.

(10) Patent No.: US 12,179,445 B2
(45) Date of Patent: Dec. 31, 2024

(54) END EFFECTOR INCLUDING RESILIENT MEMBERS BETWEEN ADJACENT HOLDING TOOLS

(71) Applicants: SYDDANSK UNIVERSITET, Odense (DK); TERMA A/S, Lystrup (DK); TECHNICON APS, Hobro (DK); NLR—NETHERLANDS AEROSPACE CENTRE, CM Amsterdam (NL)

(72) Inventors: Henrik Gordon Petersen, Odense (DK); Lars-Peter Ellekilde, Odense (DK); Ole Wennerberg Nielsen, Odense (DK); Gudmundur Geir Gunnarsson, Odense (DK); Casper Hansen, Galten (DK); Jakob Rømsgaard, Hobro (DK); André Alexander Westergaard, Ryomgaard (DK); Asger Bloksma Krogstrup, Nibe (DK); Asim Ikram, Odense (DK); Jesper Freltoft, Odense (DK); Phillippe Lovejoy-Courrier, Højbjerg (DK); Johannes Cornelis De Kruijk, BE Kraggenburg (NL)

(*) Notice: Subject to any disclaimer, the term of this patent is extended or adjusted under 35 U.S.C. 154(b) by 372 days.

(21) Appl. No.: 17/642,117

(22) PCT Filed: Sep. 8, 2020

(86) PCT No.: PCT/EP2020/075043
§ 371 (c)(1),
(2) Date: Mar. 10, 2022

(87) PCT Pub. No.: WO2021/048105
PCT Pub. Date: Mar. 18, 2021

(65) Prior Publication Data
US 2022/0371292 A1  Nov. 24, 2022

(30) Foreign Application Priority Data

Sep. 12, 2019 (EP) .................................. 19196964

(51) Int. Cl.
*B25J 15/06* (2006.01)
*B25J 15/00* (2006.01)
(Continued)

(52) U.S. Cl.
CPC ......... *B29C 70/541* (2013.01); *B25J 15/0061* (2013.01); *B25J 15/0616* (2013.01);
(Continued)

(58) Field of Classification Search
CPC  B25J 15/0052; B25J 15/0061; B25J 15/0616; B29C 31/08; B29C 31/085;
(Continued)

(56) References Cited

U.S. PATENT DOCUMENTS

| 10,407,262 B2 | 9/2019 | Jess et al. |
| 2014/0199153 A1 | 7/2014 | Reinhold et al. |

(Continued)

FOREIGN PATENT DOCUMENTS

| DE | 10 2016 103 616 A1 | 9/2016 |
| DE | 10 2017 203 468 A1 | 9/2018 |

(Continued)

OTHER PUBLICATIONS

International Search Report (4 pages) dated Dec. 17, 2020 from PCT Priority Application PCT/EP2020/075043.
(Continued)

*Primary Examiner* — Michael A Tolin
(74) *Attorney, Agent, or Firm* — Crowell & Moring LLP; John C. Freeman

(57) ABSTRACT

An end effector for handling a sheet of flexible material. The end effector includes a support frame and manipulator
(Continued)

assemblies, each attached to the support frame by a support mount. The manipulator assemblies include a holding tool having a lifting surface. The manipulator assemblies include a linear actuator, and the holding tool is connected to the linear actuator by a multiaxial joint. A drive provides—the displacement of the holding tool by the linear actuator. The end effector includes resilient members each rigidly affixed to two adjacent holding tools and positioned in a space providing a mutual distance between opposing faces of the adjacent holding tools, where each holding tool is connected to—adjacent holding tools—by the resilient members. The resilient members are configured to non-permanently deform in the space when adjacent holding tools are displaced relative to each other along displacement axes.

20 Claims, 8 Drawing Sheets

(51) Int. Cl.
*B29C 70/30* (2006.01)
*B29C 70/54* (2006.01)
*B65H 3/08* (2006.01)
*B65H 5/14* (2006.01)
*B29K 307/04* (2006.01)

(52) U.S. Cl.
CPC ........... *B29C 70/30* (2013.01); *B65H 3/0883* (2013.01); *B65H 5/14* (2013.01); *B29K 2307/04* (2013.01)

(58) Field of Classification Search
CPC ....... B29C 70/30; B29C 70/38; B29C 70/541; B29C 70/543; B29K 2307/04; B65G 47/91; B65G 47/917; B65G 47/918; B65H 3/0808; B65H 3/0883; B65H 5/08; B65H 5/14
See application file for complete search history.

(56) References Cited

U.S. PATENT DOCUMENTS

| | | |
|---|---|---|
| 2015/0314583 A1 | 11/2015 | Jess et al. |
| 2017/0001817 A1 | 5/2017 | Jess et al. |
| 2018/0304556 A1 | 10/2018 | Reinhold et al. |
| 2019/0047158 A1* | 2/2019 | Petrovski ............. B25J 15/0061 |

FOREIGN PATENT DOCUMENTS

| | | | |
|---|---|---|---|
| EP | | 0429901 A1 * | 6/1991 |
| EP | | 2 626 181 A2 | 8/2013 |
| ES | | 2 354 793 A1 | 3/2011 |
| WO | WO 2015/092364 A1 | | 6/2015 |
| WO | WO 2016/075424 A1 | | 5/2016 |

OTHER PUBLICATIONS

Written Opinion of the International Search Authority (7 pages) dated Dec. 17, 2020 from PCT Priority Application PCT/EP2020/075043.

* cited by examiner

END EFFECTOR INCLUDING RESILIENT MEMBERS BETWEEN ADJACENT HOLDING TOOLS

This application is a National Stage application of International Application No. PCT/EP2020/075043, filed Sep. 8, 2020, the entire contents of which are incorporated herein by reference.

This application claims priority under 35 U.S.C. § 119 (a) to European Patent Application No. 19196964.1, filed on Sep. 12, 2019, the entire contents of each of which are incorporated herein by reference.

BACKGROUND OF THE INVENTION

Technical Field

The present disclosure relates to an end effector for handling of a sheet of flexible material, such as carbon fiber mats. Moreover, the present disclosure relates to a method of lifting, manipulating and fastening such sheets onto a layup surface of a draping mold, a system for handling of a sheet of flexible material and use of a system.

Background Description of the Related Art

In manufacturing and fabrication environments for handling sheet of flexible material, robot or other automation solutions are utilized for a variety of purposes, tasks and processes because such machines can be programmatically controlled by a hardware processor to carry out a complex series of actions, either automatically, or as a result of user interaction. Such robots or other automation solutions may include an end effector that enables the robot to pick up a sheet of flexible material, such as a carbon fiber mat, and manipulate the shape of the sheet before placing it onto a layup surface of a draping mold. As an example, in the manufacturing of composite components made from layered sheets of flexible material, such as structural or aerodynamic components for aircraft, it may be of particular importance when stacking/layering multiple sheets onto a layup surface defined by a draping mold that the layering does not result in air pockets or bubbles being trapped between the sheets when bonded together, as this may cause undesired results in the end product after for example infusing with an epoxy or bismaleimid (BMI) resin to provide a wetting of the sheets, compacting them and curing the composite in for example an autoclave. For many applications, such air pockets or bubbles trapped inside a composite component may over time risk to compromise the structural integrity of the component, such as in response to repeated shock or stress influences. Thus, manufacturing of composite components may hence involve careful inspection of the layup process and subsequent non-destructive testing by inspection for air pockets or bubbles, such as by ultrasound scanning. As insufficient smooth placing of a single sheet may result in scrapping the composite component entirely, often because reworking is impossible after bonding, it is desired to reduce bulging, wrinkling and shearing of each sheet during the stacking of the sheets.

Moreover, manufacturing of particularly challenging composite components, such as where the layup surface is curved, may conventionally involve one or more manual fabrication steps. Manual fabrication of challenging composite components may involve repetitive and arduous tasks, which require highly skilled and trained operators, costly clean room facilities and yet, it may still result in an undesired high scrap rate due to bulging, wrinkling and/or shearing occurring during the manual manufacturing. For these reasons and others, automation may be desirable.

Various implementations of automated end effector solutions for handling sheets of flexible material exist. For example, U.S. Patent Application Publication No. 2015314583 A1 discloses a fabric handling apparatus including a fabric-handling array suspended above a layup table and a mold. The fabric-handling array includes a frame and a plurality of attractors suspended from cables below the frame. The attractors are operably connected to a height adjustment motor each configured to displace the attractor vertically with respect to the frame by spooling the cable extending between each height adjustment device and attractor. The fabric-handling array further includes a plurality of connectors in the form of flexible or rigid shafts connecting adjacent attractors to one another to maintain the attractors in a stable positional relation to one another.

European Patent Application Publication EP 0429901 A1 discloses a manipulating or holding device, particularly for handling objects made of flexible matter, including a plurality of holding tools each mounted below a node element which is fastened to and interconnected by a plurality of bar elements. The plurality of bar elements are movably interconnected to form a flat latticework. Four bar elements may be attached to each node element via movable ball ends inside radial bore holes.

International Patent Application WO 2015092364 A1 discloses an attractor solution, which includes a positioning plate to be used adjacent to a surface of a mold. One or more positioners hangs from openings in the plate, such that the positioners are moveable independently from the positioning plate. An attractor is connected to each positioner, and the attractors are connected to one another via a plurality of rods.

Additional examples of manipulator systems for fiber composite components include US 2018304556 A1, EP 2626181 A2, US 2014199153 A1 and WO 2016075424 A1.

The above mentioned solutions suffers from various drawbacks such as high complexity and/or lack of dexterity when handing, shaping and stacking flexible sheets such as mats, e.g. carbon fiber mats. Additionally, the above mentioned end effector solutions may suffer from a higher risk of reduced quality of the end product when stacking a plurality of flexible sheets, such as mats, for example carbon fiber mats on a mold surface having a more complex and/or curved surface. It is an objective of the present disclosure to overcome or reduce one or more of the above-mentioned drawbacks.

SUMMARY

Disclosed herein is, in a first aspect of the present disclosure, an end effector for handling of a sheet of flexible material, such as a carbon fiber mat, to be applied onto a layup surface defined by a draping mold, wherein the end effector includes:
  a support frame;
  a plurality of manipulator assemblies, each attached to the support frame by a support mount, wherein each manipulator assembly includes:
    a holding tool having a lifting surface, wherein the holding tool is configured for lifting a sheet;
    a linear actuator having a proximate coupling part connected to the support mount and a distal coupling part connected to the holding tool such that the holding tool is configured to be displaced along a displacement axis by means of the linear actuator, wherein the linear actuator is configured to apply a pushing force at the distal coupling part;

a multiaxial joint, wherein the holding tool is connected to the linear actuator by the multiaxial joint; and a drive for providing the displacement of the holding tool by means of the linear actuator, wherein the end effector further includes:

a plurality of resilient members each rigidly affixed to two adjacent holding tools and positioned in a space providing a mutual distance between opposing faces of the adjacent holding tools, wherein each holding tool is connected to at least two adjacent holding tools by means of the resilient members, and wherein the resilient members are configured to non-permanently deform in the space when adjacent holding tools are displaced relative to each other along the displacement axes by means of the linear actuators and to adjust, by rotating, an orientation of the lifting surfaces of the holding tools to an equilibrium orientation in response to deforming.

The inventors have found out that using resilient members for connecting adjacent holding tools, such as connecting e.g. two, three or four adjacent holding tools dependent on the respective position of the holding tool relative to the other holding tools of the end effector, and moreover using linear actuators for controlling the position of the respective holding tool to pre-shape the sheet to fit a layup surface defined by the geometric shape of a draping mold and also provide a pushing force such as by transferring a pushing force through the structure of the linear actuators and/or by operating the linear actuators of the end effector, provides advantages when using the end effector for applying the sheet of flexible material to the layup surface, such as when defined by a curved draping mold.

The linear actuators can be activated to adjust the position of the respective holding tool relative to the other holding tools and thereby pre-shape the sheet material to fit the shape of a layup surface defined by a draping mold. This adjustment also provides that a plurality of the resilient members may be non-permanently deformed and thereby provides a further adaption of the orientation of the respective holding tool to which they are connected due to the force induced to the holding tools, due to the resiliency of the resilient member, such as by transferring forces induced by other nearby holding tools.

The linear actuators helps to provide a rigid/stiff end effector structure that enables that a sufficient and controllable pushing force can be provided to the sheet material upon applying the pre-shaped material to the layup surface defined by a draping mold.

The end effector hence enables an advantageous and precise pre-shaping of a sheet by means of the end effector according to more complex surface curvatures and curves with low radii of curvature determined by a layup surface of a draping mold. This may help to provide an improved control of the application of sheets onto such surfaces in the step of manufacturing composite components made from layered sheets of flexible material. Also or alternatively, the present solution may help to increase the yield of higher quality composite components made from a plurality of sheets and having complex shapes and/or one or more areas providing curves with relatively low radii of curvature. Such higher quality composite components may include fewer, smaller and/or substantially no air bubbles trapped in between abutting sheets bonded together and/or improved attachments to abutting sheets when the composite component is substantially finished.

Such composite components to be manufactured may e.g. be chassis components, such as aerodynamic components for aircraft such as airplanes or helicopters, or it may be chassis components for other types of vehicles, such as cars, trucks, ships etc. or for any other suitable use, such as in building construction and/or the like.

The solution may also help to enable a manufacturing of composite components made from a plurality of layers of sheets having complex shapes and/or tighter radii of curvature, with an end effector instead of or augmenting manual labor, thereby enabling production at a higher manufacturing speed. Other advantages to the manufacturing of composite components with an end effector may include improved quality and/or reduced scrap rates of products.

The resilient members may also help to provide the advantage that the end effector is able to withstand wear during normal operations and to quickly recover to a state of equilibrium after more extreme operating conditions.

The term "resilient" is used to refer to the property of the resilient member being able to withstand and recoil from a perturbation or shock without permanent deformation, the resilient member is hence configured to substantially resuming its original shape after deformation such as bending, stretching and/or compression when not subjected to outer forces.

By each resilient member being rigidly affixed between two adjacent holding tools, consisting of a first holding tool and a second holding tool, the resilient member is enabled to transfer a force between a first end of the resilient member connected to the first holding tool and a second end of the resilient member connected to a second holding tool. Further, the first end of the resilient member being connected to the first holding tool enables the resilient member to exert a force on the first holding tool and vice versa, thereby allowing the adjacent holding tools to interact by an exchange of forces by means of the resilient members, e.g. when the adjacent holding tools are displaced relative to each other by the linear actuator(s).

The term adjacent is used to refer to neighboring holding tools, such as holding tools that are arranged at two squares directly next to each other in a Cartesian grid where each manipulator assembly occupies a non-overlapping square on the support frame. Thus, two adjacent holding tools are neighboring but not necessarily in contact or close proximity, instead being adjacent in the sense that there can be no other holding tools between two adjacent holding tools. By extension, the term semi-adjacent may be used to refer to the neighboring holding tools of the adjacent holding tools not comprising the adjacent holding tools themselves, such as two holding tools that are arranged with one holding tool interleaved between them in a Cartesian grid where each manipulator assembly occupies a non-overlapping square on the support frame. Typically, the holding tools are arranged to form a finite two-dimensional lattice such that each holding tool, at least at the interior of the lattice, is encircled by at least three adjacent holding tools and at least six semi-adjacent holding tools.

Attaching the plurality of manipulator assemblies to a common support frame may provide the advantage that the end effector can be mounted onto a controllable mobile support mechanism, such as a robotic arm or an overhead crane-like solution or the like, and moved as a single robust unit and easily controllable unit. The end effector may also provide the advantage that the support frame, including a plurality of attached components or sub-units, can be rotated around one or more common axes. The support frame may also help to provide a counter force when pushing the pre-shaped sheet onto a layup surface defined by a draping mold.

The holding tools provide that a sheet of flexible material may be manipulated by lifting a sheet at multiple points on the sheet and manipulating the position and orientation of one or more holding tools relative to each other such that the sheet of flexible material is moved, bent or otherwise deformed. Typically, a sheet of flexible material lifted by a plurality of holding tools is kept in contact with a lifting surface of the holding tools at a corresponding number of smaller patches of the sheet of flexible material such that there is one corresponding lifting surface centered at and covering each patch. The holding tool including a lifting surface, such as a flat surface with one or more openings for applying an airflow, may by the present solution provide the advantage that the sheet of flexible material does not slide across the lifting surfaces, such as by exerting a friction force on the sheet against a movement across the lifting surface, or may provide that such sliding is reduced, and thus the holding tools provide that each lifting surfaces remain substantially centered at and covering the same patch during the manipulating of the sheet and applying it on a mold. It is advantageous that the holding tools may remain centered at and covering the same patches of the sheet of flexible material because it enables the end effector to manipulate sheets with complicated shapes, such as sheets with holes or areas cut out, without dropping or losing control of such a sheet when one or more holding tools become misaligned to the patches.

The lifting surface of the holding tool provides that a sheet of flexible material may be lifted by the end effector by at least one holding tool exerting a lifting force. Typically, the lifting force may be distributed across one or more smaller patches of the sheet of flexible material covered by the lifting surfaces of the holding tools, given rise to an overall lifting force, which exceeds in magnitude the force of gravity acting on the sheet of flexible material.

The multiaxial joint provides that, whereas the resilient member is rigidly affixed between two adjacent holding tools, each holding tool is free to rotate with the multiaxial joint acting as pivot point with at least two rotational degree of freedom between the linear actuator and the holding tool. This helps to allow each holding tool to rotate substantially unhindered to any orientation with the multiaxial joint, such as within a predetermined orientation range made mechanically possible by the multiaxial joint or other surrounding elements, as the multiaxial joint ensures that the equilibrium orientation of each holding tool may be reached by means of the plurality of resilient members. It is advantageous that by ensuring that adjacent holding tools rotate to an equilibrium orientation, the end effector enables simultaneously control of the position and the orientation of each holding tool by means of displacing adjacent or semi-adjacent holding tools relative to each other along the displacement axes by means of the linear actuators.

In one or more aspects of the present disclosure, the linear actuator may be configured to adjust an orientation of the lifting surface of the holding tool to an equilibrium orientation by displacing one or more adjacent holding tools relative to each other, wherein the equilibrium orientation is defined by the position and/or orientation of the adjacent holding tools and the plurality of resilient members.

The term "equilibrium orientation" is used to refer to the orientation of adjacent holding tools wherein a physically coupled system comprising a plurality of manipulator assemblies connected by a plurality of resilient members is in a state of equilibrium such that at least the forces acting upon the holding tools by means of the resilient members are balanced. Typically, such a physically coupled system will remain at rest relative to the support frame when in the state of equilibrium. As an example, in an embodiment of the system where the resilient members are springs in tension, any rotation of holding tools away from the state of equilibrium will tend to stretch or elongate some of the springs further, thus providing a restoring force.

In some embodiments, adjusting, by rotating, an orientation of the lifting surfaces of the holding tools to an equilibrium orientation in response to the resilient members non-permanently deforming includes spatially rotating said lifting surface by a small amount so that the orientation of the holding tool reaches the equilibrium orientation. Typically, said small amount includes a first rotation around a first axis by less than 30° and optionally a second rotation around a second axis by less than 15°. In some embodiments, deformation of the resilient members may rotate the lifting surfaces of the holding tools from multiple orientations to about the same equilibrium orientation.

Thus, resilient members being configured to non-permanently deform when adjacent holding tools are displaced relative to each other along the displacement axes may provide that the lifting surfaces of the holding tools be rotated into their equilibrium orientation regardless of their initial orientation by said deformation of the resilient members. It may be advantageous that each orientation of the lifting surface of each holding tool is dependent on the position and/or orientation of adjacent holding tools, but at the same time also largely independent of any prior positions and orientations, because this provides that each orientation is controllable and reliably predictable.

In one or more aspects of the present disclosure, the plurality of resilient members may be springs, such as tension springs and/or coil springs, such as tension coil springs. In some embodiments, each resilient member may be substantially straight in an unaffected state and hence provide a longitudinal direction in that state.

Using springs such as tension springs and/or coil springs as the resilient members for connecting the holding tools may help to provide an advantageous resiliency characteristic that provides an improved and durable manipulation of the orientation of the holding tools to which the respective spring is connected when the linear actuators are controlled in order to pre-shape a sheet to a surface shape defined by a draping mold by providing a relative displacement of the holding tools.

The springs being rigidly affixed to the holding tools may provide the advantage that the holding tools are self-aligning towards an equilibrium orientation wherein each holding tool are oriented such that the resilient members are, for fixed positions of the multiaxial joints, deformed to a minimal energy configuration.

The resilient members being springs may provide the advantage of reducing the overall weight of the end effector compared to using an active control system for rotating the holding tools, such as by electro-mechanical rotary actuators, thereby requiring a lower load bearing capacity for a robot handling system comprising a robotic arm for lifting and manipulating the end effector. It is understood that springs, having the intrinsic properties of being resilient and flexible, enable each resilient member to exert a force by means of converting elastic potential energy stored in the spring to kinetic energy, such as when generating a force or torque for rotating the adjacent holding tools to which the spring is attached until an equilibrium orientation of the lifting surfaces of the holding tools is reached. This passive process thus differs from an active control system in that it may not involve chemical or electrical energy.

The end effector having coil springs as the resilient members may comprise coil springs with a large number of revolutions, such as more than 10 revolutions, or more than 15 or 20 revolutions, which may behave as cylindrically symmetrical springs with respect to material properties along and/or across a central helical axis. Thus, the end effector having coil springs with a large number of revolutions may provide the advantage that the resilient members have a uniform bending stiffness along the central helical axis of each coil spring, such that the resilient members are enabled to non-permanently deform, such as by letting the coil spring deflect from the central helical axis of the coil spring along a curve with non-zero curvature.

In further aspects of the present disclosure, the resilient members may be other types of springs, such as leaf springs or wave springs.

In one or more aspects of the present disclosure, the springs may have a spring constant between 10 N/m and 100 kN/m, such as between 100 N/m and 10 kN/m, such as between 100 N/m and 500 N/m, such as between 500 N/m and 3 kN/m, such as between 3 kN/m and 30 kN/m.

Such ranges of spring constant parameters may be especially suitable when handling and laying up flexible sheets, though the range of 100 N/m and 10 kN/m or less may be especially suitable for woven flexible sheets such as carbon fiber mats.

By the springs having a spring constant of a certain value, it is understood that the springs have a linear-elastic characteristic according to Hooke's law for continuous media corresponding to the certain value of the spring constant.

In one or more aspects of the present disclosure, the springs may be made of a metal, such as spring steel, such as stainless steel, or titanium.

The springs being made of a metal may e.g. help to provide a durable solution where the spring comprises desirable resiliency properties.

In still further aspects of the present disclosure, the plurality of resilient members may be flexible rods, such as nylon rods, rubber rods, glass fiber rods or polymer rods. Such flexible rods may in one or more aspects of the present disclosure have a linear-elastic characteristic according to Hooke's law for continuous media corresponding to a Young's modulus between 1 MPa and 10 GPa, such as between 10 MPa and 1 GPa, such as between 10 MPa and 100 MPa, such as between 100 MPa and 900 MPa, such as between 900 MPa and 3 GPa.

It is generally understood that if the resilient members are springs, such as coil springs, these may be configured to be substantially straight and/or cylindrical in an unaffected/undeformed state and hence provides a longitudinal direction along a central axis in that state. It is generally understood that the rigid affixing may in some aspects of the present disclosure substantially prevent or reduce a rotation of the end part of the spring relative to the holding tool to which the respective end part of the spring it is connected, such as between 0.5-30%, such as between 1-10% e.g. between 1-5% of the length of the spring determined in an unaffected state, at least around an axis extending in a direction transverse to the longitudinal direction of the spring, such as when the spring is in a substantially unaffected state.

In one or more aspects of the present disclosure, rigidly affixing of the resilient member, such as a coil spring, to the holding tools includes one or more of:
  mounting braces including receiving recesses into which an end part of the resilient member are positioned so as to rigidly affix the end part of the resilient member,
  mounting braces including a receiving protrusion around which an end of the resilient member is positioned so as to rigidly affix the end part of the resilient member and/or
  mounting braces providing an adhesive, welding and/or molded connection to the resilient members so as to rigidly affix an end part of the resilient member.

This may e.g. help to provide a sufficient rigid affixing of the end parts of the resilient members. For example, in aspects of the present disclosure where the resilient member is a coil spring, a plurality of windings of each end part of the coil spring may be rigidly connected to the holding tool, and hence provide a resistance against sideways deformation due to the inherent resiliency of the spring. This may help to provide advantageous counter forces by the spring when the linear actuators actuates the holding tools to move relative to each other. The inventors have seen indications that this may be advantageous to obtain an improved equilibrium orientation of the holding tools that may have a reduced error when pre-shaping the flexible sheet to a target shape before applying it onto the layup surface defined by a draping mold/and or during providing the sheet to the layup surface.

In one or more aspects of the present disclosure, the support mount may be an articulating support bracket configured for providing at least one positional and/or rotational degree of freedom, such as at least two rotational degrees of freedom, between the support frame and the linear actuator, such as a hinge arrangement or a track roller guidance system.

The articulating support bracket helps to provide that each manipulator assembly may be suspended from the support frame such that the weight of the plurality of manipulator assemblies, the plurality of resilient members and the sheet of flexible material is supported by the support frame. By configuring each articulating support bracket to provide at least one positional and/or rotational degree of freedom between the support frame and the linear actuator, each of the manipulator assemblies are allowed to move and/or rotate independently of the support frame, and thus also independently of the other manipulator assemblies, such as by rotating with the articulating support bracket as a pivot point. Allowing the manipulator assemblies to move and/or rotate independently from each other, such as with the articulating support brackets acting as pivot points with at least one rotational degree of freedom, may provide the advantage that the end effector is able to manipulate a sheet of flexible fabric while allowing at least a few interacting holding tools to displace relative to each other in response to introducing additional tensile and/or shear stress at the sheet due to the interacting holding tools such as to minimize forces arising from tensile and/or shear stress at the sheet. In particular, a deformation of any of the plurality of resilient members may provide that the manipulator assemblies move and/or rotate, such that the mutual distance between opposing faces of two adjacent holding tools is allowed to change in response to the deformation.

The term "pivot point" is used to refer to the center of a rotational system with one or more rotational degrees of freedom, such as the fulcrum of a lever acting as the pivot point with one rotational degree of freedom, such as the suspension point of a Foucault pendulum acting as the pivot point with two rotational degrees of freedom, such as the center of mass of a rigid body acting as the pivot point with three rotational degrees of freedom. Typically, for a rotational system with two or more rotational degrees of freedom, the pivot point is at the point of intersection between two or more corresponding axes of rotation.

The inventors have found that computer simulations indicates that an end effector solution comprising articulating support brackets as support mounts, linear actuators and resilient members such as for example springs, e.g. coil springs connected to the holding tools as described above, may reduce the overall error of the orientation of the lifting surfaces of the holding tools in the equilibrium orientation, compared to a determined target shape which may be below 5°, such as between 1-3°. This also applies when more complex target shapes are desired to provide layup of the sheet on doubly curved layup surfaces having principal radius of curvature numerically less than 1 m, such as numerically less than 50 cm, such as numerically less than 30 cm. Substantially similar simulations on conventional end effector solutions having e.g. a rod member connected to a holding tool by means of a hinge connected at each end of the rod indicates a substantially higher undesired error up to e.g. 15-20° compared to the determined target shape.

In one or more aspects of the present disclosure, the support mount may be an articulating support bracket configured for providing at least two rotational degrees of freedom between the support frame and the linear actuator, such as a bracket comprising a universal joint.

In still further aspects of the present disclosure, the articulating support bracket may be a Hooke's joint assembly including a journal and two yokes or a gimbal assembly comprising an inner gimbal, an outer gimbal and a mounting bracket.

By the articulating support bracket being configured for providing two rotational degrees of freedom between the support frame and the linear actuator, the articulating support bracket provides that the manipulator assembly may rotate, while being suspended below the support frame, in response to a torque along a horizontal axis, such as an angle-dependent torque arising from the force of gravity acting on the manipulator assembly at an angle with the articulating support bracket as the fulcrum.

Typically, the articulating support bracket does not allow rotation around an axis perpendicular to the interface between the support frame and the articulating support bracket, such as around a vertical axis when the support frame is horizontal, such as around the displacement axis.

Enabling the manipulator assembly to rotate in response to a torque along one or more horizontal axes, specifically an angle-dependent torque arising from the force of gravity, may provide the advantage that the manipulator assemblies align to the force of gravity when suspended below the support frame. By each manipulator assembly aligning to the force of gravity in absence of other forces contributing to the torque along a horizontal axis, the end effector may provide the advantage that the manipulator assemblies are parallel as default.

In particular, by configuring each articulating support bracket to provide two rotational degree of freedom between the support frame and the linear actuator, any two interacting holding tools may be displaced relative to each other along an axis between the interacting holding tools when the manipulator assemblies are parallel and the interacting holding tools are equal distances from the support frame. Allowing the manipulator assemblies to rotate independently from each other with the articulating support brackets acting as pivot points with two rotational degrees of freedom may provide the advantage that the end effector is able to manipulate a sheet of flexible fabric without introducing additional tensile and/or shear stress at the sheet due to the interacting holding tools because the manipulator assemblies are allowed to rotate freely at the articulating support brackets to cancel out or minimize forces arising from tensile and/or shear stress at the sheet.

In one or more aspects of the present disclosure, the plurality of resilient members are further configured to change the mutual distance between opposing faces of the adjacent holding tools in response to the displacement of holding tools by means of the linear actuators, such as so that an arc length along the resilient member is kept substantially constant when manipulating the sheet.

The term "arc length" is used to refer to the distance between the points where the resilient member is rigidly affixed between two adjacent holding tools as measured along the resilient member. By keeping the arc length along the resilient member constant, the end effector provides that a sheet of flexible material, such as a carbon fiber mat, be subject to reduced shear stresses when lifting the sheet, such as from a flat surface, and when manipulating the shape of the sheet by means of the holding tools.

It is often desirable to reduce shear stresses during handling of sheets of woven fabrics, such as carbon fiber mats, which are simultaneously flexible and comprised of individual fibers typically aligned along two orthogonal axes giving rise to very anisotropic mechanical properties. It is advantageous that the end effector provides reduced shear stress during handling of a sheet of flexible material, such as during automated lay-up of carbon fiber mats for the manufacture of aerodynamic structures made from carbon fiber composites, which may help to reduce undesirable bulging, wrinkling and shearing of the sheet, such as when contacting pre-impregnated carbon fiber mats to facilitate bonding.

The arc length along each resilient members may be kept constant to within an acceptable tolerance during normal operations, such as varying by less than 10% or remaining in the interval from 90% to 110% of the average arc length, such as varying by less than 5% or remaining in the interval from 95% to 105% of the average arc length. It is advantageous that whereas the acceptable tolerance corresponding to the maximally allowable shear stresses is defined by the type of flexible material and the intended application, the maximal variations of the arc length during normal operations is primarily determined by the characteristics of the resilient members, thus allowing for fast repurposing of the end effector to a different type of flexible material by modifying or replacing the plurality of resilient members.

In one or more aspects of the present disclosure, the multiaxial joint may be configured for providing at least two rotational degrees of freedom between the linear actuator and the holding tool, such as a universal joint.

In still further aspects of the present disclosure, the multiaxial joint may be a Hooke's joint assembly including a journal and two yokes or a gimbal assembly comprising a swivel joint, an inner gimbal and an outer gimbal.

In one or more aspects of the present disclosure, the multiaxial joint may be configured for providing three rotational degrees of freedom between the linear actuator and the holding tool, such as a ball-and-socket joint. In still further aspects of the present disclosure, the multiaxial joint may be a spheroidal joint or a roll-pitch-yaw spherical wrist joint.

In one or more aspects of the present disclosure, the plurality of resilient members may be further configured to resist a perturbation to the orientation of the lifting surfaces of the holding tools away from the equilibrium orientation, such as so that each holding tool is kept rotationally fixed with the lifting surfaces at the equilibrium orientation when manipulating the sheet.

The term "rotationally fixed" is used to refer to the holding tool being kept at fixed orientation, such as at the equilibrium orientation, while at the same time allowing the position of the holding tool to change without constraints. By keeping each holding tool rotationally fixed at the equilibrium orientation, the end effector provides that a sheet of flexible material, such as a carbon fiber mat, be subject to reduced bending moments when lifting the sheet, such as from a flat surface, and when manipulating the shape of the sheet, such as when pre-shaping the sheet according to a layup surface of a draping mold, by means of the holding tools.

It may be important to reduce bending moments during handling of sheets of woven fabrics, such as carbon fiber mats, which are simultaneously flexible and comprised of individual fibers typically very prone to bending fatigue. It is advantageous that the end effector provides reduced bending moments during handling of a sheet of flexible material, such as during automated lay-up of carbon fiber mats for the manufacture of composite components such as structures made from carbon fiber composites, which may help to reduce undesirable bulging, wrinkling and fatigue damage of the sheet, such as when contacting pre-impregnated carbon fiber mats to facilitate bonding.

The holding tool may be kept rotationally fixed at the equilibrium orientation to within an acceptable tolerance during normal operations by deviations from the equilibrium orientation being less than 15° around any rotation axis, such as less than 5° around a horizontal rotation axis. It is advantageous that since the maximal deviations from the equilibrium orientation experienced during normal operations is primarily determined by the characteristics of the resilient members, the end effector may be adapted to a specific flexible material or application primarily by tailoring the plurality of resilient members.

In one or more aspects of the present disclosure, the plurality of manipulator assemblies may be arranged on a plurality of lattice points of a finite two-dimensional lattice, each lattice point occupied by one corresponding holding tool. End effectors of this type may be advantageous when handling sheets, such as woven sheets, for fastening onto a layup surface of a draping mold. An arrangement of the plurality of manipulator assemblies according to a lattice may provide the advantage that the sheet is well supported by the holding tools and that the sheet may be adequately pre-shaped to fit the shape of the layup surface by the lifting surfaces of the holding tools aligning to the surface normal of the layup surface at patches corresponding to the lattice points.

The plurality of lattice points may not necessarily be planar, as only the lattice is two-dimensional. Typically, the lattice points are three-dimensional points. Arranging the plurality of manipulator assemblies on a plurality of lattice points of a finite two-dimensional lattice, such as at points on the support frame, may provide the advantage that the manipulator assemblies are positioned at a repeating arrangement of points, such as regularly spaced points.

In one or more aspects of the present disclosure, the holding tools may be connected by the plurality of resilient members to form a polygon mesh having an interior and a boundary, wherein the boundary includes a plurality of corners, and wherein the polygon mesh is formed by:

each holding tool at the interior being connected to at least four of the adjacent holding tools by the plurality of resilient members;

each holding tool at the plurality of corners with acute interior angles being connected to at least three of the adjacent holding tools by the plurality of resilient members; and each holding tool at the plurality of corners with obtuse interior angles being connected to at least two of the adjacent holding tools by the plurality of resilient members.

By each holding tool at the interior of the polygon mesh being connected to at least four of the adjacent holding tools, and each holding tool at the corners of the polygon mesh with obtuse interior angles being connected to at least three of the adjacent holding tools, the end effector provides that the holding tools are thoroughly interconnected by the plurality of resilient members. The holding tools being thoroughly interconnected may provide the advantage that manipulating the position and/or orientation of one or more holding tools provides greater influence over the equilibrium orientation of the holding tools.

In one or more aspects of the present disclosure, the plurality of manipulator assemblies may be arranged on a regular grid and/or in a repeating pattern beneath the support frame, such that a at least 10 uniformly spaced holding tools may be involved in lifting a sheet of flexible material of workable dimensions, such as at least 50 holding tools for lifting a sheet of flexible material spanning a 1 m$^2$ area, such as at least 100 holding tools for lifting a sheet of flexible material spanning a 2 m$^2$ area.

Arranging the plurality of manipulator assemblies in a regular grid may provide the advantage that a larger number of equidistantly spaced holding tools may be involved in lifting a sheet of flexible material of workable dimensions compared to an unstructured or irregular grid. The workable dimensions of sheets of flexible material may vary depending on the application, but the workable dimensions may have a lower bound defined by the shortest distance between adjacent holding tools and an upper bound defined by the dimensions and load bearing capacity of the support frame. Typically, workable dimensions for a sheet of flexible material may refer to a shape no less than 30 cm by 30 cm and no more than 3 m by 3 m, but is not limited to square or rectangular shapes. The regular grid may be a Cartesian grid, where each manipulator assembly occupies a non-overlapping square beneath the support frame. Alternatively, the regular grid may be any other form of tessellation, where each manipulator assembly is arranged in a repeating pattern beneath the support frame, such as a closed-packed honeycomb or a triangular tiling.

In one or more aspects of the present disclosure, the linear actuators may be configured to move the holding tools for pre-shaping the sheet according to a draping mold having a layup surface and to fasten, by pushing, the sheet onto the layup surface by means of the pushing force.

When pre-shaping the sheet according to the draping mold, prior to fastening the sheet onto the layup surface, such as by gradually bringing the sheet into contact with the layup surface, only one linear actuator per holding tool is required to align each holding tool according to a desired orientation. Aligning each holding tool to a desired orientation may thus be achieved by displacing adjacent holding tools relative to each other by means of the linear actuators. It is advantageous that only one linear actuator per holding tool is required to align each holding tool according to a desired orientation, thus reducing the overall weight of the end effector, thereby requiring a lower load bearing capacity for a robot handling system comprising a robotic arm for lifting and manipulating the end effector. Further, by only one linear actuator per holding tool being required, the end effector may provide the advantage that the holding tools may be spaced tighter together as the spacing may be determined by clearance requirements of the linear actuators, which are typically larger. It is advantageous that the holding tools may be spaced closer together as this may help to ensure that the end effector can pre-shape a sheet of flexible material according to a draping mold with a highly curved layup surface, such as a doubly curved layup surface having principal radius of curvature numerically greater than 12 cm and numerically less than 30 cm.

In one or more aspects of the present disclosure, pre-shaping the sheet according to the layup surface of the draping mold may include fitting the shape of the sheet to the shape of the layup surface.

In one or more aspects of the present disclosure, the layup surface may be curved, having at least one principal radius of curvature at one or more points on the layup surface, such as a conical surface, a cylindrical surface or a ruled surface, wherein the principal radii of curvature are numerically greater than 10 cm at all points on the layup surface, such as numerically greater than 12 cm, such as numerically greater than 15 cm, and wherein at least one of the principal radii of curvature is numerically less than 3 m at least at one point on the layup surface, such as numerically less than 1 m, such as numerically less than 50 cm, such as numerically less than 30 cm. In some embodiments, the layup surface is curved having principal radii of curvature at one or more points on the layup surface, wherein the principal radii of curvature are numerically greater than 10 cm at the one or more points, such as numerically greater than 12 cm, such as numerically greater than 15 cm. In further embodiments, the principal radii of curvature may be numerically greater than 10 cm at substantially all points on the layup surface, such as with the exception of edges. Substantially all points may include at least a majority of points on the layup surface.

In some embodiments, the layup surface is curved having at least a first principal radius of curvature at one or more points on the layup surface, wherein the at least a first principal radius of curvature is numerically less than 3 m at one or more of said points on the layup surface, such as numerically less than 1 m, such as numerically less than 50 cm, such as numerically less than 30 cm. In some embodiments, the layup surface may be curved having two principal radii of curvature at one or more points on the layup surface, wherein said principal radii of curvature are numerically less than 30 cm at least at one of said points on the layup surface.

It is advantageous that the layup surface of the draping mold being curved may allow for the construction of carbon fiber composites according to a surface of a three-dimensional geometric shape, such as an aerodynamic structure, as three-dimensional geometric shapes typically comprise one or more curved surfaces, whereas few shapes have only flat surfaces, such as a cube.

It is understood that robotic handling of a sheet of flexible material, such as a carbon fiber mat, is made challenging by allowing the at least one principal radius of curvature to be as numerically low as 10 cm at all points on the layup surface. Consequently, designing and operating an end effector according to the present disclosure, which is capable of pre-shaping a sheet according to a considerably curved layup surface of a draping mold, may be difficult and require significant skill.

The term "principal radii of curvature" is used to refer to the curvature radii at a point on the layup surface corresponding mathematically to the eigenvalues of the shape operator for a parametrization f: $\mathbb{R}^2 \rightarrow \mathbb{R}^3$ of the layup surface. It is understood that the principal radii of curvature are intrinsic properties relating to the curvature of the surface of the three-dimensional geometric shape, such as an aerodynamic structure. The principal radii of curvature are a measure of how the layup surface bends by different amounts along two principal directions at that point on the layup surface, thus expressing a radius of curvature of along two normal sections of the layup surface corresponding to the two principal directions, wherein the principal directions specify the directions of minimum and maximum curvature. In the special case where the curvature is zero along one of these directions, one of the two principal radii of curvature is not finite and thus undefined.

In one or more aspects of the present disclosure, the layup surface of the draping mold may be doubly curved having two principal radii of curvature at least at one point on the layup surface, such as a hemisphere, such as an elliptic paraboloid, such as a hyperbolic paraboloid, such as a freeform surface.

It is advantageous that the layup surface of the draping mold being a doubly curved surface may allow for the construction of carbon fiber composites according to complex freeform surface often used in computer-aided design (CAD) and various fields of engineering, such as in aerospace engineering, to describe the surface of a three-dimensional geometric shape, such as an aerodynamic structure.

Robotic/automation handling of layup of sheets of flexible material, such as a carbon fiber mats, may be challenging on doubly curved surfaces, for example if allowing both the two principal radius of curvature to be numerically lower than 3 m, such as at least at one point on the layup surface. An end effector according to the present disclosure may help to improve pre-shaping a sheet according to a considerably doubly curved layup surface of a draping mold.

In one or more aspects of the present disclosure, the support frame of the end effector may be connected to a controllable mobile support mechanism, such as a robotic arm, configured to move and/or rotate the end effector.

By connecting the support frame of the end effector to a controllable mobile support mechanism, the controllable mobile support mechanism may be enabled to control the position and/or orientation of the support frame while providing a load bearing capacity no less than the weight of the end effector. The controllable mobile support mechanism being configured to move and/or rotate the end effector may provide the advantage of enabling a controller to simultaneously control the position and/orientation of the end effector, and the end effector itself, either automatically, or as a result of user interaction by means of a user interface.

In one or more aspects of the present disclosure, each linear actuator may be configured to fasten, by pushing, the sheet onto the layup surface with the linear actuator by the drive actuating the linear actuator towards the layup surface with the pushing force being greater in magnitude than a minimum compaction force required to fasten the sheet onto the layup surface, such as a pushing force greater in magnitude than the force of gravity acting on each holding tool, such as a force greater in magnitude than the force of gravity acting on the manipulator assembly.

It is advantageous that the end effector is configured to push with a force greater in magnitude than a minimum compaction force required to fasten the sheet onto the layup surface because enabling that the force is greater than the minimum compaction force required to fasten the sheet onto the layup surface may help to ensure that the sheet is securely fastened, such as with carbon fiber mats pre-impregnated with epoxy or bismaleimid (BMI) resin referred to as "pre-preg", which require a significant compaction force to facilitate bonding onto each other.

In one or more aspects of the present disclosure, each resilient member may be configured to non-permanently deform by bending along a spline curve with non-zero curvature in the space between adjacent holding tools.

Each resilient member being configured to non-permanently deform by bending along a spline curve between the adjacent holding tools may provide the advantage of letting the resilient member deflect from a central axis, such as an axis between the points where two adjacent holding tools are connected by the resilient member, along a spline curve with a non-zero curvature. Enabling the resilient members to bend with a non-zero curvature may provide the advantage that the resilient members have a low bending stiffness along the central axis, such that each resilient member may deform by deflecting from a central axis in response to a bending moment arising from a force acting perpendicular to the central axis. The resilient members may further have a piecewise constant bending stiffness, which for certain geometries of the resilient members, such as a cylindrical geometry, may then provide that the resilient members deflect with a piecewise constant non-zero curvature along the spline curve.

It is understood that an elongated geometric shape made from a uniform elastic material will, at least to an acceptable degree of accuracy, deform by bending along a spline curve with a piecewise constant non-zero curvature in response to clamping the elongated geometric shape at a plurality of points not in a line. In particular, this holds when clamping an elongated geometric shape at two points at a skew angle, wherein clamping includes each end of the elongated geometric shape being rigidly affixed.

In one or more aspects of the present disclosure, a rotation of each holding tool to an equilibrium orientation comprises aligning the lifting surfaces tangentially to a minimum-curvature spline surface which interpolates each spline curve spanned by the plurality of resilient members, such that a direction of lift normal to the lifting surface aligns with the surface normal of the minimum-curvature spline surface at least at one point on the lifting surface.

The term "minimum-curvature spline surface" is used to refer to a mathematical construct of a continuous and differentiable surface in three spatial dimensions passing through a set of control points along the plurality of resilient members. Typically, a tangent plane to the minimum-curvature spline surface at each particular control point comprises at least one direction, which is parallel to a central axis of a corresponding resilient member at the control point. By each resilient member bending along a spline curve, and by the minimum-curvature spline surface interpolating each spline curve spanned by the plurality of resilient members, the minimum-curvature spline surface provides an intuitive illustration of the collective deformation of the plurality of resilient members as a mathematical surface. The minimum-curvature spline surface may be used in analyzing the deformation of the resilient members in response to forces and torques involved in determining the equilibrium orientation of each holding tool. Typically, such a minimum-curvature spline surface may be constructed as a polynomial approximation to the surface of a three-dimensional geometric shape, such as an aerodynamic structure.

In one or more aspects of the present disclosure, the holding tool may comprise one or more openings at the lifting surface configured for applying an airflow at the one or more openings to generate a lifting force, such as with a suction cup.

Such holding tools may help to provide a space saving and light end effector solution that may be advantageous in order to enable a high quality layup solution for flexible sheets such as woven sheets.

In one or more aspects of the present disclosure, the suction cup may be a suction cup through which a flow of air is withdrawn by a pump or vacuum generator. The holding tools may also in further aspects be a Bernoulli gripper, or a hybrid of a suction cup and a Bernoulli gripper such as with a Bernoulli-vacuum gripper such as disclosed in e.g. DE102017203468A1 or the like.

In one or more aspects of the present disclosure, the holding tool may be a suction cup. In other aspects of the present disclosure, the plurality of holding tools may comprise one or more suction cups, one or more Bernoulli grippers or the like.

The suction cup may provide the advantage of enabling control of the lifting force generated at the lifting surface of the holding tool, such as with a suction cup connected to a vacuum generator and a vacuum switch or valve.

In one or more aspects, the suction cup may comprise one or more openings at the lifting surface configured for applying a suction or partial vacuum at the one or more openings to generate a lifting force by means of a vacuum generator. It is advantageous that a vacuum generator may generate a lifting force at the lifting surfaces of a plurality of suction cups, such as more than 10 suction cups, by applying a suction or partial vacuum to each of them. Such a suction cup may provide a space and/or weight saving and easily controllable solution for lifting a sheet of flexible material, such as a carbon fiber mat.

In one or more aspects of the present disclosure, the linear actuator may comprise a sensor configured for providing positional feedback of an actuated distance for position control of the distal coupling part of the linear actuator, such as with an encoder using a Hall Effect sensor or a potentiometer.

By the linear actuator comprising a sensor configured for providing positional feedback for position control of the distal coupling part of the linear actuator, the end effector may provide the advantage of enabling accurate and durable position control of the distal coupling part of the linear actuator. Typically, position control of the distal coupling part of the linear actuator is provided by the drive exerting a pushing force or pulling force along the displacement axis to control the position of the distal coupling part relative to the proximal coupling part.

By providing accurate and durable position control of the distal coupling part of the linear actuator, the end effector may provide the advantage of applying a more appropriate amount of pushing force at the distal coupling part of the linear actuator, such as for fastening a sheet of flexible material onto a layup surface of a draping mold, with greater repeatability in a manufacturing environment.

In one or more aspects of the present disclosure, the linear actuator may be an electro-mechanical linear actuator and/or the drive may be a stepper motor.

Such a linear actuator may provide a space and/or weight saving and easily controllable solution for displacing the holding tools relative to each other.

In one or more aspects of the present disclosure, the non-permanent deformation of each resilient member, having a first end rigidly affixed to a first holding tool and a second end rigidly affixed to a second holding tool, may include bending to rotate the first end together with the first holding tool and the second end together with the second holding tool, such that the first end rotates a substantially equal amount around a first common pivot point as the first holding tool and the second end rotates a substantially equal amount around a second common pivot point as the second holding tool, wherein the first common pivot point is at the multiaxial joint of the first holding tool and the second common pivot point is at the multiaxial joint of the second holding tool.

A non-permanent deformation of each resilient member, which includes bending to rotate a first end and a second end together and/or in unison with a first holding tool and a second holding tool, respectively, may help to provide a dynamic coupling or constraint between the rotation of the holding tool and the non-permanent deformation of the resilient member. This may help to provide an improved control of the orientation of the lifting surfaces in order to enable the end effector to be used with draping molds having more curved surfaces.

In one or more aspects of the present disclosure, the non-permanent deformation of each resilient member, having a first end rigidly affixed to a first holding tool and a second end rigidly affixed to a second holding tool, may include a rotation of the resilient member as a whole, such that the first end rotates a substantially equal amount around a third common pivot point as the second end, wherein the third common pivot point is between the first end and the second end.

In one or more aspects of the present disclosure, the plurality of resilient members may each be rigidly affixed between two adjacent holding tools at opposing faces of the adjacent holding tools.

By the plurality of resilient members being rigidly affixed between two adjacent holding tools at opposing faces of the adjacent holding tools, the end effector may provide the advantage that each resilient members may be connecting two adjacent holding tools along a straight line between them, wherein the straight line does not intersect any of the other holding tools. Each resilient member may non-permanently deform from a first shape along the straight line to a second shape along a space curve, such as by bending along a spline curve, and then return to the first shape by undergoing a deterministic relaxation from the second shape back to the first shape. Typically, the space curve does not intersect any of the other holding tools nor the sheet during normal operations. By rigidly affixing each resilient member at opposing faces of the adjacent holding tools, the end effector may provide the advantage that none of the plurality of resilient members come into contact with the sheet during normal operations. It is understood that the opposing faces of the adjacent holding tools are located substantially at the exterior of each holding tool.

In one or more aspects of the present disclosure, the plurality of manipulator assemblies may be arranged to cover a plurality of patches of the sheet of flexible material by the lifting surfaces of the holding tools such that at least 10% of an area spanned by the sheet of flexible material may be comprised in the total area of the plurality of patches, such as between 10% and 75% of the area spanned by the sheet of flexible material, such as between 20% and 50% of the area spanned by the sheet of flexible material.

It is advantageous that arranging the plurality of manipulator assemblies in a regular grid provides that a substantial percentage of the area spanned by the sheet of flexible material, such as more than 10%, such as between 10% and 75%, such as between 20% and 50%, may be covered by one of the lifting surfaces of the holding tools. Lifting by a substantial percentage of the area of the sheet of flexible material distributes the total lifting force required to lift the sheet more evenly, which may help to prevent the sheet from uncontrollably flexing, drooping or unintendedly contacting other mechanical devices during robotic handling of the sheet. Additionally, lifting the sheet by a plurality of patches provides many points of leverage for handling the sheet, each holding tool being a point of leverage, which may allow the end effector to more accurately and/or reliably manipulate the sheet into a desired shape.

In one or more aspects of the present disclosure, each holding tool may include at least two mounting braces, such as receiving recesses or protrusions, for rigidly affixing the plurality of resilient members.

The at least two mounting braces may provide the advantage of allowing the resilient members to be rigidly affixed to the holding tools. Each of the mounting braces provides that any of the resilient members, having a first end and a second end, may be rigidly affixed at the mounting brace by firmly securing the first end or the second end of the resilient member, such as by clamping the first end or the second end at the mounting brace.

In one or more aspects of the present disclosure, each mounting brace in the at least two mounting braces may comprise a locking device, such as a screw, for securely clamping the resilient members at the mounting brace.

The locking device, such as a screw, may provide the advantage of allowing for fast repurposing of the end effector to a different type of flexible material by replacing the plurality of resilient members rigidly affixed between two adjacent holding tools, such as by unfastening the screw, replacing the resilient member in the mounting brace and re-engaging the locking device, such as by re-tightening the screw.

In one or more aspects of the present disclosure, the multiaxial joint may be a ball-and-socket joint, such as a ball joint including a ball stud and a socket.

It is advantageous that a ball-and-socket joint is a compact joint, which does not introduce additional spacing between the linear actuator and the holding tool, the ball-and-socket joint enabling the socket to be integrated into the holding tool. The socket being integrated into the holding tool provides the advantage of reducing the minimum distance between the multiaxial joint and the lifting surface compared to using an active control system for rotating the holding tools. By reducing the minimum distance between the multiaxial joint and the lifting surface, any undesirable torque arising from the force of gravity acting on the holding tool with the multiaxial joint as the fulcrum can be effectively suppressed, which may improve the control of the orientation of the holding tools.

In one or more aspects of the present disclosure, the ball-and-socket joint is made of a metal, such as stainless steel, such as brass, such as bronze.

It is advantageous that a ball-and-socket joint may be machined or fabricated to dimensional tolerances to provide reduced friction, such as between the ball stud and the socket, even or especially when unlubricated, thus enabling the orientation of each holding tool at the multiaxial joint to easily change. In further aspects of the present disclosure, the ball-and-socket joint may be made of a polymer, such as thermoplastic, such as polyethylene terephthalate (PET), such as polylactic acid (PLA), acrylonitrile butadiene styrene (ABS), such as polytetrafluoroethylene (PTFE). A ball-and-socket joint made of polymer provides reduced weight compared to a ball-and-socket joint e.g. made of metal, thus reducing the overall weight of the end effector, thereby requiring a lower load bearing capacity for a robot handling system comprising a robotic arm for lifting and manipulating the end effector.

Disclosed herein is, in a second aspect of the present disclosure, a method of operating an end effector according to any of the aspects disclosed above, the method including:
- lifting a sheet from an inventory surface, such as a flat surface, by holding the lifting surfaces in contact with the sheet;
- orienting the lifted sheet to a pre-determined orientation according to a layup surface by means of a controllable mobile support mechanism, such as a robotic arm,
- deriving a set of relative positions based on a target shape;
- moving the holding tools to a set of relative positions via the linear actuators such that the sheet is pre-shaped according to the target shape, thereby adapting the lifting surfaces according to the layup surface by the non-permanent deformation of at least a subgroup of the plurality of resilient members, without contacting the layup surface; and
- fastening, by pushing, the pre-shaped sheet onto the layup surface at the pre-determined orientation via the holding tools to form part of a workpiece.

Hereby one or more advantages as e.g. described above may be obtained. For example it may provide a solution which enable improved adaption to more curved draping mold surfaces.

In one aspect, the target shape may comprise measurements of the physical shape of the layup surface, such as obtained from performing a three-dimensional scanning of the layup surface. In another aspect, the target shape may include one or more geometrical parameters or virtual measurements characteristic of a computer-aided design (CAD) representation of the layup surface, the draping mold or the intended geometrical shape of the workpiece. In yet another aspect, the target shape may comprise a median or running average of a plurality of substantially identical layup surfaces or workpieces.

In one or more aspects of the present disclosure, the method may further:
- after fastening the sheet onto the layup surface, lifting, orienting and fastening at least one other sheet of flexible material onto the fastened sheet to form part of the workpiece.

By fastening at least one other sheet of flexible material onto the fastened sheet, the method may provide the advantage of enabling the production of a workpiece comprising two or more sheets of flexible materials with different physical properties, such as a composite component comprising differently oriented carbon fiber mats, which include individual fibers typically aligned along two orthogonal axes giving rise to improved anisotropic mechanical properties. The method enabling the production of a workpiece comprising two or more sheets of flexible materials may provide the advantage that the composite workpiece, when combined, has improved physical or mechanical properties compared to each of the flexible materials.

In one or more aspects of the present disclosure, the method may further include:
- compacting the sheet and the at least one other sheet onto the layup surface by a vacuum bagging device, such that the sheet and the at least one other sheet are bonded together.

In one or more aspects of the present disclosure, obtaining a target shape of the layup surface may include performing a three-dimensional scanning of the layup surface with an optical sensor, such as a structured-light 3D scanner, such as a time-of-flight 3D laser scanner.

By obtaining a target shape of the layup surface with an optical scanner, the method may provide the advantage of not contacting the layup surface, which is particularly advantageous when the layup surface must be kept clean, or when other materials have already been placed on the layup surface, such that contacting may result in sticking, cross-contamination or misalignment. Measuring the shape of the layup surface with an optical sensor providing a three-dimensional scanning of the layup surface may provide the advantage of accurately representing a target shape on the layup surface as a plurality of points, such as a point cloud in three-dimensional Euclidian space. By representing the target shape on the layup surface as a plurality of points, the method may provide the advantage of enabling data processing on the target shape by performing a series of data processing steps on the a plurality of points to efficiently achieve an accurate representation of the layup surface. By obtaining the target shape as a three-dimensional scanning of the layup surface, the method enables the set of relative positions to be derived by transferring a spatial relationship of the target shape in three spatial dimensions to a spatial relationship between the holding tools.

In one or more aspects, deriving a set of relative positions from the target shape includes modelling the non-permanent deformation of the plurality of resilient members in response to moving the holding tools to a proposed set of relative positions. Alternatively or additionally, a set of relative positions may be derived based on the target shape by look-up in a table, from geometrical parameters etc. The step of deriving a set of relative positions may include measuring the extension of the linear actuators after manipulating the holding tools such that the sheet is pre-shaped according to a target shape, for example in a manual calibration step.

It is advantageous that the non-permanent deformation of the plurality of resilient members may be calculated from the equilibrium state of a first coupled system comprising the plurality of resilient members, which are resilient, and the plurality of holding tools, which are rotatable, by thus being reliably predictable. It is understood that the first coupled system, having a set of internal degrees of freedom, is suitable for modelling based on being reliably predictable. The equilibrium state of the first coupled system being reliably predictable provides that the set of internal degrees of freedom of the first coupled system is uniquely determined as a function of the positions of the multiaxial joints. It is advantageous that a desired equilibrium state of the first coupled system, wherein each lifting surface is tangent to the surface of a three-dimensional geometric shape, such as an aerodynamic structure, may be realized by first modeling the internal degrees of freedom of the first coupled system in response to varying the positions of the multiaxial joints by means of the linear actuators and then comparing the model to the desired equilibrium state. By enabling modelling, the first coupled system provides that a first equilibrium state, such as an initial state, may be reliably altered into a second equilibrium state, which more accurately corresponds to a desired equilibrium state, thus providing improved efficiency in handling of the sheet of flexible material.

In one or more aspects of the present disclosure, moving the holding tools to the set of relative positions may include displacing the holding tools along the displacement axes towards a substantially uniform distance from the layup surface by means of the linear actuators, such that the pre-shaped sheet is substantially uniformly separated from the layup surface.

By displacing the holding tools along the displacement axes towards the substantially uniform distance by means of the linear actuators, the method may provide the advantage that the sheet of flexible material is pre-shaped, prior to lowering, according to the shape of the layup surface and is positioned to be fastened to the layup surface by displacing the holding tools towards the layup surface. The substantially uniform distance is typically a small distance, such as a few centimeters, which provides that the holding tools only need to be displaced by the small distance for fastening the sheet onto the layup surface, which may help to reduce undesirable deformation of the sheet during contacting.

In one or more aspects of the present disclosure, fastening, by pushing, the sheet onto the layup surface may include lowering the holding tools towards the layup surface from the substantially uniform distance by means of the linear actuators including the steps of:
- at a first step, displacing a first holding tool along the displacement axis towards the layup surface until the sheet is contacting the layup surface at a first patch;
- at a second step, subsequent to the first step, displacing one or more adjacent holding tools along the displacement axes towards the layup surface until the sheet is contacting the layup surface at the first patch and one or more second patches, wherein the one or more adjacent holding tools are adjacent to the first holding tool;
- at a third step, subsequent to the second step, displacing one or more semi-adjacent holding tools along the displacement axes towards the layup surface until the sheet is contacting the layup surface at the first patch, the one or more second patches and one or more third patches, wherein the one or more semi-adjacent holding tools are semi-adjacent to the first holding tool and adjacent to the one or more adjacent holding tools; and
- at a fourth step, subsequent to the third step, displacing one or more other holding tools along the displacement axes towards the layup surface until the sheet is contacting the layup surface at each patch below the holding tools.

It is advantageous that the method provides that the sheet of flexible material may be gradually fastened, such as by sequentially displacing one or more holding tools towards the layup surface in a number of steps, because the sheet contacting the layup surface at one patch after another may help to reduce bulging, wrinkling and shearing of the sheet, such as when contacting pre-impregnated carbon fiber mats to facilitate bonding. By the sheet contacting the layup surface at one patch below the first holding tool, then more patches below one or more adjacent holding tools and so forth, the method provides the advantage that the sheet is gradually fastened to the layup surface by propagating the boundary between fastened and unfastened parts of the sheet in a controlled wave front or ripple-like manner. Gradually fastening the layup surface in this way may help to reduce undesirable bulging, wrinkling and shearing of the sheet, such as when contacting pre-impregnated carbon fiber mats to facilitate bonding.

In one or more aspects of the present disclosure, the sheet of flexible material may include a plurality of fibers, such as a carbon fiber mat.

The sheet may, e.g., be a woven carbon fiber fabric. It is advantageous that the end effector may be operable to handle sheets of flexible material including a plurality of fibers because it enables the manufacturing of composite components made from layered sheets of flexible material where the plurality of fibers may be oriented so as to improve the structural and/or mechanical properties of the composite component.

In one or more aspects of the present disclosure, the method may further include:
- measuring at least one fiber direction of the plurality of fibers prior to orienting the sheet; and
- deriving a rotation angle from the at least one fiber direction for orienting the sheet by rotating the support frame.

In one or more aspects of the present disclosure, measuring at least one fiber direction of the plurality of fibers may be performed by an optical sensor, such as a polarization camera.

By measuring at least one fiber direction of the plurality of fibers in the sheet of flexible material with an optical sensor, the method may provide the advantage of not contacting the sheet, which is particularly advantageous when the plurality of fibers must be kept from bending during measurement of the at least one fiber direction by virtue of the material of the sheet being flexible, or when other materials have already been placed on the sheet, such that contacting may result in sticking, cross-contamination or misalignment.

In one or more aspects of the present disclosure, orienting the sheet may include orienting the at least one fiber direction substantially parallel to at least one pre-determined direction, such as to within 10°, such as to within 5°.

Disclosed herein is, in a third aspect of the present disclosure, a system for handling of a sheet of flexible material, such as a carbon fiber mat, comprising a controllable mobile support mechanism, such as a robotic arm, a controller and an end effector according to any of the aspects disclosed above, wherein the end effector is mounted on a controllable mobile support mechanism and wherein the controller comprises a hardware processor for controlling the end effector and the controllable mobile support mechanism, either automatically, or as a result of user interaction by means of a user interface.

Disclosed herein is, in a fourth aspect of the present disclosure, a non-transitory computer readable medium storing a computer program product including instructions which, when executed by the hardware processor of a system according to the third aspect, are configured for controlling the end effector and the controllable mobile support mechanism for provisioning the method according to of any of the aspects disclosed above.

Disclosed herein is, in a fifth aspect of the present disclosure, use of a system according to the third aspect for handling of a sheet of flexible material, such as a carbon fiber mat, wherein the controller is configured for controlling the end effector and the controllable mobile support mechanism so as to provide the method according to of any of the aspects disclosed above.

BRIEF DESCRIPTION OF THE DRAWINGS

Various examples are described hereinafter with reference to the figures. Like reference numerals refer to like elements throughout. Like elements will, thus, not be described in detail with respect to the description of each figure. It should also be noted that the figures are only intended to facilitate the description of the examples. They are not intended as an exhaustive description of the claimed invention or as a limitation on the scope of the claimed invention. In addition, an illustrated example needs not have all the aspects or advantages shown. An aspect or an advantage described in conjunction with a particular example is not necessarily limited to that example and can be practiced in any other examples even if not so illustrated, or if not so explicitly described.

DESCRIPTION OF EXAMPLES

Figure 1:
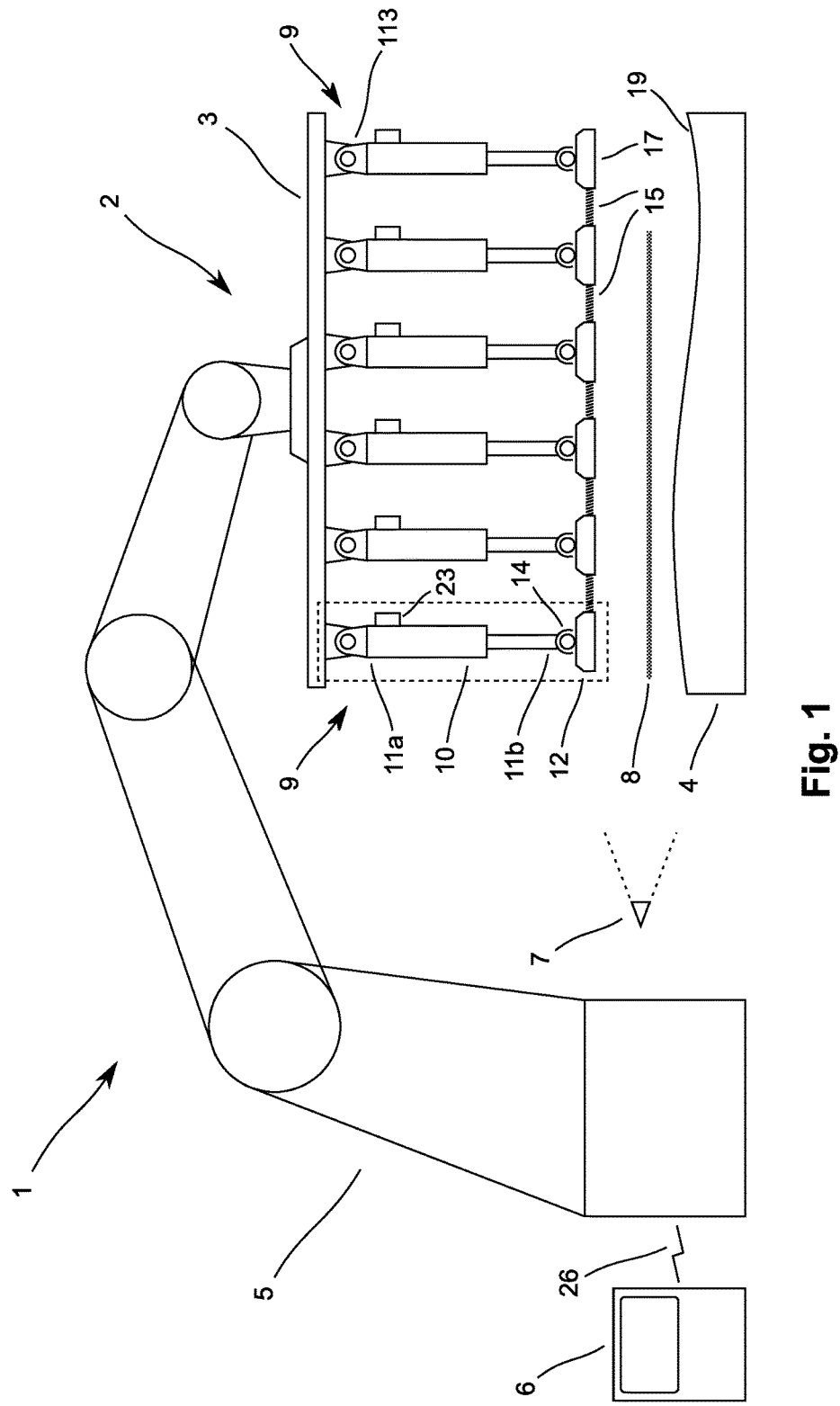
FIG. 1 illustrates a system for handling of a sheet of flexible material, such as a carbon fiber mat according to embodiments of the present disclosure.

Exemplary examples will now be described more fully hereinafter with reference to the accompanying drawings. In this regard, the present examples may have different forms and should not be construed as being limited to the descriptions set forth herein. Accordingly, the examples are merely described below, by referring to the figures, to explain aspects. Expressions such as "at least one of," when preceding a list of elements, modify the entire list of elements and do not modify the individual elements of the list.

The spatially relative terms "lower" or "bottom" and "upper" or "top", "below", "beneath", "less", "above", and the like, may be used herein for ease of description to describe the relationship between one element or component and another element or component as illustrated in the drawings. It will be understood that the spatially relative terms are intended to encompass different orientations of the device in use or operation, in addition to the orientation depicted in the drawings. For example, in the case where a device illustrated in the drawings is turned over, elements described as being on the "lower" side of other elements, or "below" or "beneath" another element would then be oriented on "upper" sides of the other elements, or "above" another element. Accordingly, the illustrative term "below" or "beneath" may include both the "lower" and "upper" orientation positions, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below, and thus the spatially relative terms may be interpreted differently depending on the orientations described.

Throughout the specification, when an element is referred to as being "connected" or "coupled" to another element, the element can be "directly connected" or "directly coupled" to the other element or the element can be "connected" or "coupled" to the other element with one or more intervening elements interposed therebetween. In contrast, when an element is referred to as being "directly connected" or "directly coupled" to another element, there are no intervening elements interposed therebetween. however certain words used to describe a spatial proximity between elements may not require one or more intervening elements to describe the relationship between the elements as not being directly in a spatial proximity (e.g. "adjacent" versus "directly adjacent", "neighboring" versus "directly neighboring"), or conversely, the one or more intervening elements may be the space between the elements.

The terminology used herein is for the purpose of describing particular examples only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined in the present specification.

Exemplary examples are described herein with reference to cross section illustrations that are schematic illustrations of idealized examples, wherein like reference numerals refer to like elements throughout the specification. As such, variations from the shapes of the illustrations as a result, for example, of manufacturing techniques and/or tolerances, are to be expected. Thus, examples described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. Some of the parts, which are not associated with the description, may not be provided in order to specifically describe exemplary examples of the present disclosure.

FIG. 1 is a graphical illustration of a system for handling of a sheet 8 of flexible material, such as a mat, e.g. a woven mat such as e.g., a carbon fiber mat, comprising a controllable mobile support mechanism 5, such as a robotic arm, a controller 6 and an end effector 2. The system is shown with a draping mold 4 having a layup surface 19, upon which the sheet 8 of flexible material is to be applied by means of the end effector 2. The layup surface 19 includes at least a portion of the top surface of the geometrical shape of the draping mold, such that a sheet 8 of flexible material may be placed or stacked onto the layup surface. The end effector 2 includes a support frame 3, which is mounted below the controllable mobile support mechanism 5 such that the end effector 2 can be moved as a single robust unit and controllable unit by the controllable mobile support mechanism 5. A plurality of manipulator assemblies 9 are suspended below the support frame 3 by support mounts 113 in the form of articulating support brackets. The articulating support brackets 113, which function as support mounts, also provide a rotational freedom of movement to each of the manipulator assemblies 9 in relation to the support frame 3. The articulating support bracket 113 may be a bracket including a universal joint. The controllable mobile support mechanism 5 may be a multiaxial robotic arm with a plurality of rotatable joints, e.g. as illustrated by circles in FIG. 1.

The universal joint may itself in embodiments of the present disclosure include two hinged brackets arranged e.g. concentrically perpendicular to each other, for example so that two rotational degrees of freedom is provided by the universal joint. Alternatively, the articulating support bracket 113 may be a ball joint.

In one embodiment of the articulating support bracket 113, it is contemplated that an elastic coupling may be provided between the support frame 3 and each of the manipulator assemblies 9. In yet another variation of the articulating support bracket 113, each of the manipulator assemblies may be suspended to extend below the support frame 3 by a rigid rod positioned through a conical hole in the support frame 3 with the rigid rod having a ball end preventing it from passing through the conical hole.

A manipulator assembly 9 is shown with a dashed rectangular outline to illustrate that each manipulator assembly includes a linear actuator 10, a holding tool 12, a multiaxial joint 14 and a drive 23. The linear actuator 10 comprises a housing and a push rod and is operable to adapt a relative position between the housing and the push rod in a substantially linear motion, such as by sliding the push rod along a corresponding opening, track or groove in the housing, by means of for example a ball screw (not illustrated) translating a rotational motion of the drive 23 to a substantially linear motion of the push rod.

The linear actuator 10 may in embodiments of the present disclosure be electro-mechanically operated by the drive 23. The drive 23 may be a stepper motor providing accurate control of the rotational motion either by controlling an angular position of a driven end of the drive 23, such as in a plurality of integer increments of a fraction of a full revolution. Alternatively, the drive 23 may be an electrical motor with closed-loop control, such as a brushless DC motor, and the linear actuator 10 may instead include a sensor configured for providing positional feedback of the linear motion for position control of the push rod, such as with an encoder using a Hall Effect sensor or a potentiometer.

In an embodiment of the end effector 2, the linear actuator 10 may instead be a gear rack comprising a pinion gear and a correspondingly toothed rack. In yet another variation of the end effector 2, it is contemplated that the linear actuator 10 may be pneumatically operated.

The linear actuator 10 has a proximal coupling part 11a, which is the end nearest to the support frame 3, where a support mount 13, or particularly in the embodiment an articulating support bracket 113, connects the linear actuator 10 to the support frame 3. Further, the linear actuator 10 has a distal coupling part 11b, which is the end furthest away from the support frame 3, where a multiaxial joint 14 connects the linear actuator 10 to the holding tool 12. The multiaxial joint 14 is a joint configured for providing at least two, such as three, rotational degrees of freedom between the linear actuator 10 and the holding tool 12.

In one or more embodiments of the present disclosure, the multiaxial joint 14 may be a spherical joint wherein the at least two, such as three, rotational degrees of freedom are provided around at least two, such as three, axes of rotation which intersect at a common pivot point. In one variation of the multiaxial joint 14, it is contemplated that a spherical rolling joint comprising a spherical inner and outer race or bushing separated by ball bearings (not illustrated in FIG. 1) may be employed to reduce friction.

In a first embodiment, the multiaxial joint 14 may be a universal joint configured for providing two rotational degrees of freedom between the linear actuator 10 and the holding tool 12. In a further embodiment of the present disclosure, the multiaxial joint 14 may be a ball-and-socket configured for providing three rotational degrees of freedom between the linear actuator 10 and the holding tool 12. It is understood that providing one or more rotational degrees of freedom enables a largely unhindered rotational motion around one or more rotational axes, but that such rotational motion may not necessarily be unbounded in terms of an angular range of motion. As an example, the multiaxial joint 14 may provide an angular range of motion less than 90°, such as less than 30°, for any of three rotational motions (roll, pitch and yaw).

The holding tool 12 has a lifting surface 17 which provides that the holding tool 12 may contribute a lifting force FL (not illustrated in FIG. 1, see e.g. FIG. 3) at the lifting surface 17 towards lifting the sheet 8 of flexible material, typically by a plurality of holding tools 12 lifting together in unison.

The plurality of manipulator assemblies 9 are shown suspended below the support frame 3, with the proximal coupling part 11a of each linear actuator 10 about vertically above the distal coupling part 11b, such that the multiaxial joints 14 may be positioned at an about horizontal plane below the linear actuators 10. Each of the holding tools 12 is shown suspended below a multiaxial joint 14, such that the lifting surface 17 is provided at a lowermost face or underside of the holding tool 12. Such an arrangement may help to provide that a sheet 8 of flexible material may be picked up from an inventory surface 22, such as a flat surface, by the end effector 2 with the lifting surfaces 27 positioned and oriented in coordination to fit the inventory surface 22 and the lifting forces FL acting in a direction having a force component substantially opposite to the direction of the force of gravity.

By the holding tools 12 being connected to a common support frame 3 though the linear actuators 10, each holding tool 12 may be displaced relative to other holding tools 12 along a displacement axis AX1 (see FIG. 2c) extending in the longitudinal direction of the linear actuator, by means of the linear actuator 10 above it. In one or more embodiment, each holding tool may have a unique displacement axis AX1 defined by a straight line extending in the longitudinal direction of the linear actuator between the proximal coupling part 11a and the distal coupling part 11b of the linear actuator 10 connected to it.

It is understood that the support frame 3 may be kept at about the same orientation, such as substantially horizontal, by the controllable mobile support mechanism 5 when the holding tools 12 are being displaced and/or when lifting the sheet 8.

A plurality of resilient members 15, are shown between the holding tools 12 with each resilient member 15 rigidly affixed at either end to two adjacent holding tools 12 and positioned between them to maintain the two adjacent holding tools 12 in a stable positional relation to one another by coupling the holding tools 12 together.

As FIG. 1 illustrates a side view of the end effector 2, even though it may appear that the plurality of manipulator assemblies 9 are place in a row, it is understood that the plurality of manipulator assemblies 9 may be arranged in any suitable pattern across the support frame 3. Particularly, it is understood that the end effector 2 may be better equipped to lift and manipulate a sheet 8 of flexible material with the holding tools 12 arranged substantially along a two-dimensional plane, such as a horizontal plane. A coupling between the holding tools 12 by means of the resilient members 15 in such an arrangement may equally include at least a subset, such as half, of the plurality of the resilient members 15 being perpendicular to the other resilient members 15. The functionality of the resilient members 15 is described in more details below, e.g. in relation to FIGS. 2a-2d and FIG. 3.

In one or more embodiments of the present disclosure, the controller may include one or more hardware processors for controlling the controllable mobile support mechanism 5, such as a robotic arm or alternatively a crane solution such as an overhead crane solution. In a first embodiment, the controller may include a first hardware processor for controlling the drives 23. In a second embodiment, the controller may be operable to transmit commands to a second hardware processor at each drive 23 via a data communication link 26.

In one or more embodiments of the present disclosure, an optical sensor 7 may provide input data to the controller 6, such as geometrical parameters relating to the positon and orientation of the end effector 2 in relation to the layup surface 19 and/or the sheet 8 of flexible material. In yet another embodiment, the optical sensor 7 may provide measurements of the three-dimensional shape of the layup surface 19 and/or of a structural property of the sheet 8 of flexible material to be used during a layup process when lifting, manipulating or fastening the sheet 8 onto the layup surface 19. The optical sensor 7 may also provide a way of uniquely identifying a particular instance of a sheet 8 among an assortment of nearly-identical sheets 8 available from an inventory, such as by scanning a quick response (QR) code or barcode on the sheet 8 and providing an identifier to the controller 6.

Figure 2A:
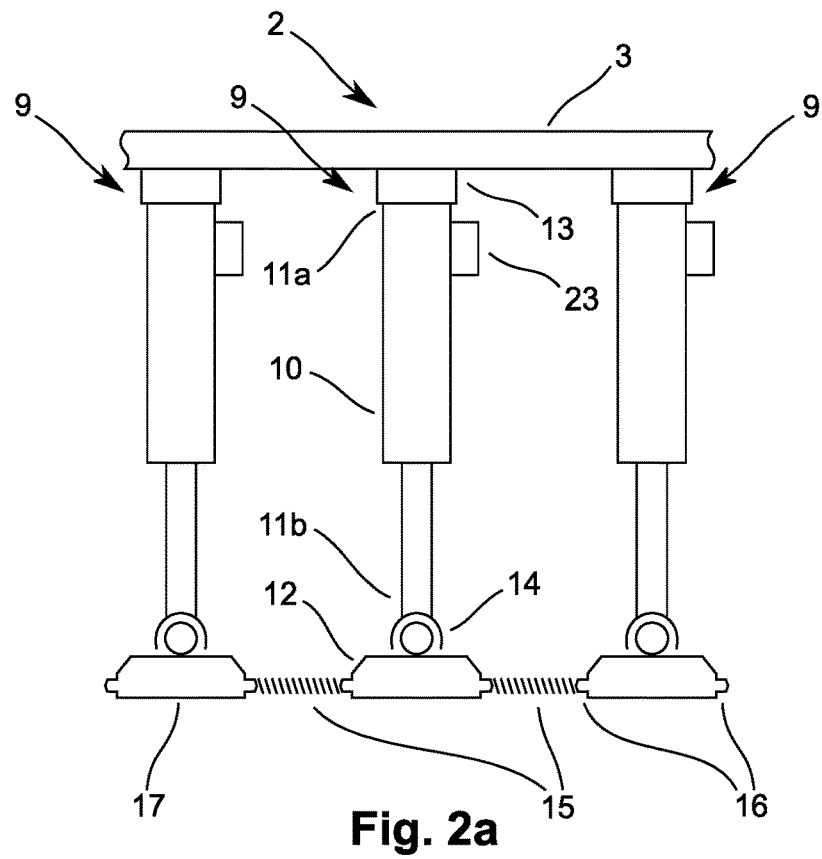
FIG. 2a illustrates a portion of an end effector according to embodiments of the present disclosure with support mounts and mounting braces.

FIG. 2a is a graphical illustration of a portion of an end effector 2 according to a embodiments of the present disclosure with support mounts 13 and mounting braces 16.

A plurality of manipulator assemblies 9 are suspended below the support frame 3 by support mounts 13, which may comprise a bracket or slot for rigidly affixing the proximal coupling part 11a of the linear actuators 10 to the support frame 3. Alternatively, the support mount 13 may be integrated into the structure of the support frame 3 providing structural anchoring or bracing points by which one or more linear actuators 10 can be fastened or supported. Each holding tool 12 is connected to a distal coupling part 11b of a linear actuator 10 by a multiaxial joint 14, and further comprise at least two mounting braces 16 for rigidly affixing one end of at least some of the plurality of resilient members 15 at each holding tool 12. The mounting braces 16 may be formed as an integral part of the structure of each holding tool 12, such as holes or protrusions. Alternatively, the mounting braces 16 may be threaded inserts, brace clamps or studs provided at the exterior of the holding tool 12.

Figure 2B:
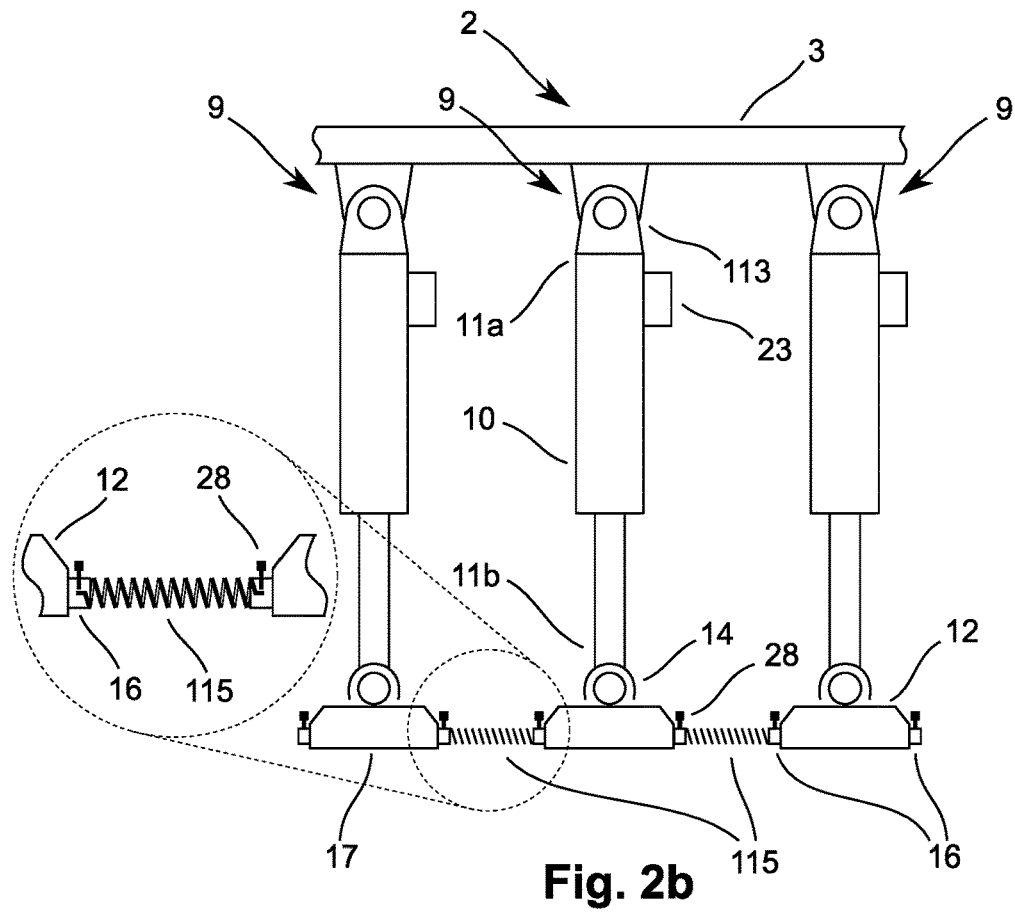
FIG. 2b illustrates a portion of an end effector according to embodiments of the present disclosure with articulating support brackets and mounting braces for resilient members in the form of springs.

FIG. 2b is a graphical illustration according to one or more embodiments of the present disclosure of a portion of an end effector 2 such as described according to one or more embodiments above in relation to FIG. 1. The end effector here comprises articulating support brackets 113 as e.g. previously described.

FIG. 2b moreover illustrates a further embodiment of the present disclosure comprising mounting braces 16 and locking devices 28 for rigidly affixing, such as directly connecting/affixing, each end of a plurality of resilient members 115 in the form of springs between two adjacent holding tools 12.

It is generally understood that in embodiments of the present disclosure, resilient members may be springs 115, such as tension springs and/or coil springs, such as tension coil springs. In one or more further embodiments of the present disclosure, if the resilient member 15 is a spring, the spring 115 may have a spring constant between 10 N/m and 100 kN/m, such as between 100 N/m and 10 kN/m, such as between 100 N/m and 500 N/m, such as between 500 N/m and 3 kN/m, such as between 3 kN/m and 30 kN/m. The springs may e.g. be made of a metal, such as spring steel, such as stainless steel, or titanium.

If the spring 115 is a tension spring (e.g. in the form of a coil spring), it may also in embodiments of the present disclosure be a compression spring allowing the spring to be compressed from the relaxed substantially un-deformed/unaffected state to provide a spring force. However, it may alternatively in other embodiments of the present disclosure alone be a tension coil spring that is not a coil spring, and may hence not be able to be substantially compressed in its longitudinal direction in the relaxed un-deformed state, whereas a stretching of the spring will provide a force according to the spring constant properties of the spring.

The resilient members such as a coil spring, may be substantially straight in an unaffected state and hence provide a longitudinal direction in that state (not illustrated in the figs).

The circular inset in FIG. 2*b* shows an enlarged cutout of two adjacent holding tools 12 with a resilient member in the form of a coil spring 115 positioned between them and rigidly affixed at the mounting braces 16 by locking devices 28 clamping at each of the two ends of the spring 115. The locking device 28 may be a screw or bolt which can be tightened to fasten the two ends of the spring 115. Alternatively, the locking device 28 can be glue or welds.

Hence, the rigidly affixing of the springs to the holding tools may include mounting braces 16 comprising receiving recesses into which the end part of the springs extends so as to rigidly affix the end part of the spring, (and the locking devices 28 may hence hold the springs in the recess).

Also or alternatively, the mounting braces 16 may include a receiving protrusion (see FIG. 2*a*) around which the end of the coil spring extends so as to rigidly affix the end part of the spring.

Additionally or alternatively, the mounting braces may include an adhesive connection to the spring(s) so as to rigidly affix the end part of the spring, e.g. by welding, gluing and/or by a melted or molded, fixed connection at the ends of the resilient member such as a coil spring.

Figure 2C:
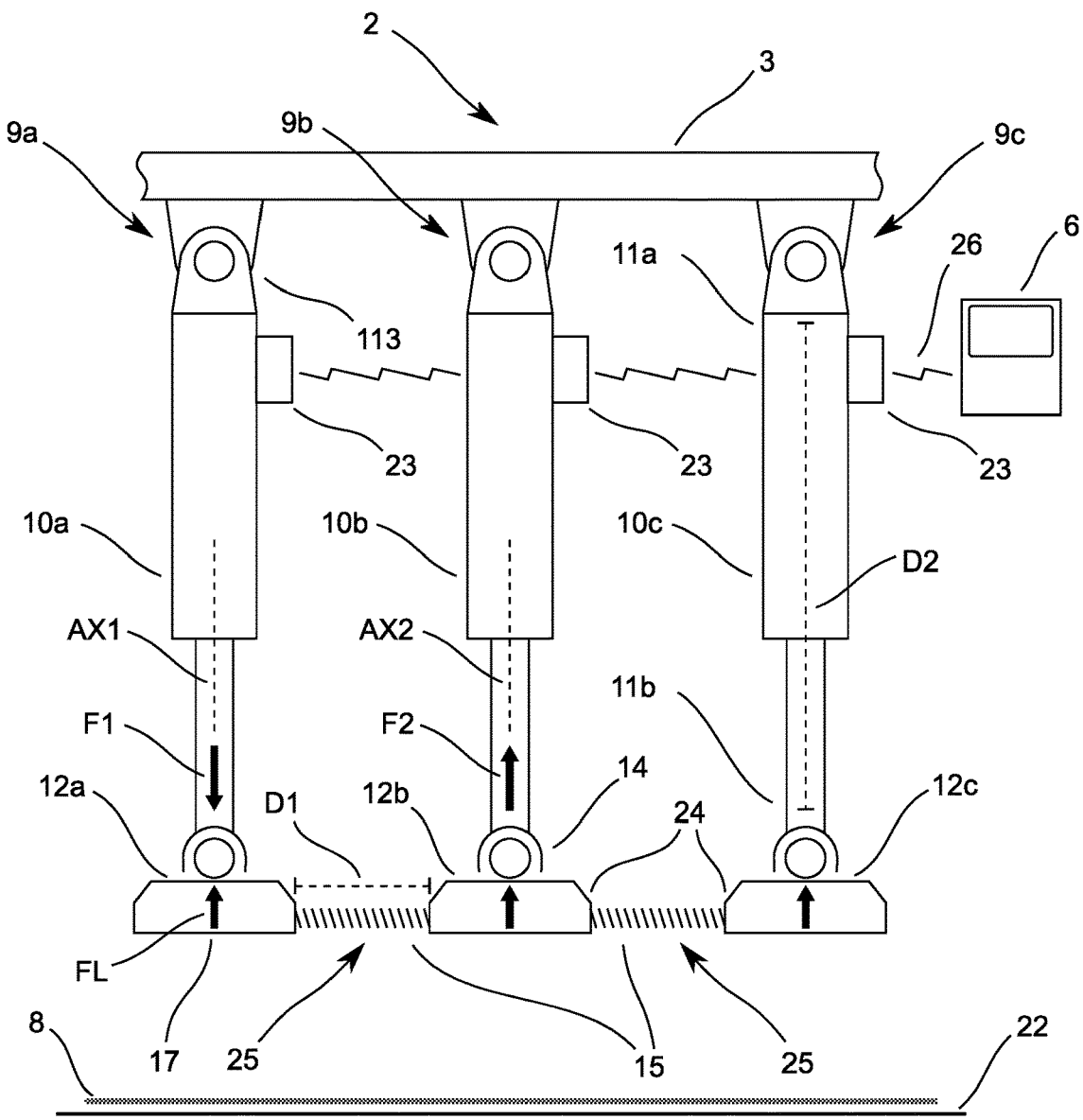
FIG. 2c illustrates a portion of an end effector such as illustrated in FIG. 1 according to one or more embodiments of the present disclosure showing a controller connected to a drive at each linear actuator.
Figure 2D:
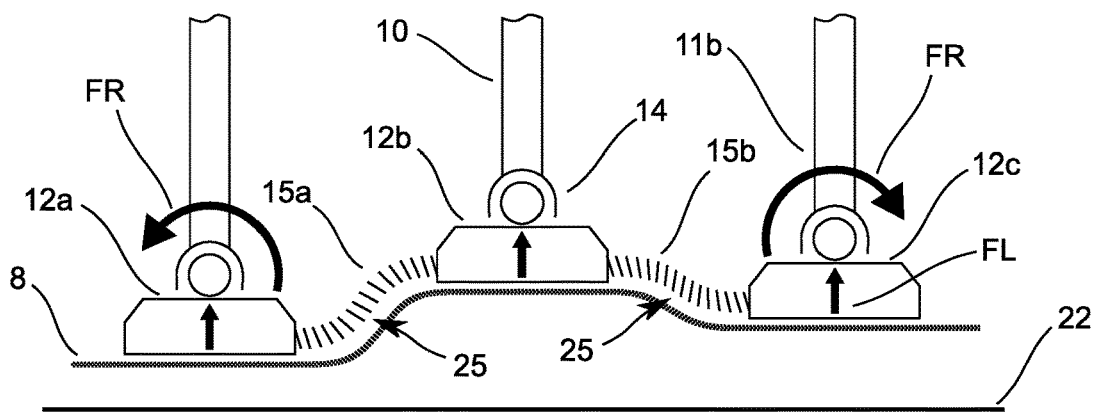
FIG. 2d illustrates a sub-portion of an end effector according to one or more embodiment of the present disclosure where the plurality of resilient members are configured to non-permanently deform in a space when adjacent holding tools are displaced relative to each other.

As can be seen from among others FIGS. 1-2*d*, the resilient members may generally be positioned in a space 25 providing a mutual distance D1 (see FIG. 2*c*) between opposing faces 24 of the adjacent holding tools. The resilient members are hence configured to non-permanently deform in the space 25 when adjacent holding tools (2*a*-12*c* are displaced relative to each other along the displacement axes AX1, AX2 as e.g. illustrated in FIGS. 2*d*, 3 and/or 5*a*-5*c* when actuating the linear actuators, and hence to adjust, by rotating, an orientation of the lifting surfaces 17 of the holding tools 12, 12*a*-12*c* to an equilibrium orientation in response to the deforming.

FIG. 2*c* is a graphical illustration of a portion of an end effector 2 such as illustrated in FIG. 1 according to one or more embodiments of the present disclosure with a controller 6 connected to a drive 23 at each linear actuator 10. The end effector 2 may be operable to lift a sheet 8 from an inventory surface 22, such as a flat surface, by holding one or more lifting surfaces 17 providing lifting forces FL in contact with the sheet 8.

The linear actuators 10*a*-10*c* may be operable to adapt an actuated distance D2 by exerting a pushing or pulling force F1, F2 along a displacement axis AX1, AX2 by means of the drive 23. The actuated distance D2 may be a distance between a proximal coupling part 11*a* and a distal coupling part 11*b* of the linear actuator 10*c*. Alternatively, the actuated distance D2 may be a measurement expressing a range of displacement of a holding tool 12*c* along the displacement axis AX1, AX2 by means of the drive 23.

A first linear actuator 10*a* comprising a cylindrical housing and a push rod positioned concentrically in the cylindrical housing is shown having a first displacement axis AX1 through a central axis of the push rod, such as an axis of cylindrical symmetry. A second linear actuator 10*b* having a second displacement axis AX2 is shown next to and arranged substantially in parallel to the first linear actuator 10*a* at a common support frame 3. The arrangement of the first linear actuator 10*a* and the second linear actuator 10*b* provides that a first holding tool 12*a* connected to the first linear actuator 10*a* by a multiaxial joint 14 may be adjacent to a second holding tools 12*b* connected to the second linear actuator 10*a* by another multiaxial joint 14. A resilient member 15 is shown positioned in a space 25 between opposing faces 24 of the adjacent first and second holding tools 12*a*-12*b*. The resilient member 15 provides that adjacent holding tools 12*a*-12*b* are at a mutual distance D1 greater than zero.

In one or more embodiments of the present disclosure, a first linear actuator 10*a* may be configured to apply a pushing force F1 at a distal coupling part 11*b* of the first linear actuator 10*a*. In a further embodiment, a second linear actuator 10*b* may be configured to apply a pulling force F2 at the distal coupling part 11*b* of the second linear actuator 10*b*. In yet a further embodiment, a third linear actuator 10*c* may be configured to adapt an actuated distance D2 between the proximal coupling part 11*a* and distal coupling part 11*b* of the third linear actuator 10*c*. The controller 6 and the drives 23 provide that each linear actuator 10*a*-10*c* may be controlled independently at the same time and/or be configured to perform different operations at different times. It is understood that the direction of pushing forces F1 and pulling forces F2 will substantially point towards and away from a multiaxial joint 14 connected to the linear actuator 10*a*-10*b*, respectively.

FIG. 2*d* is a graphical illustration of a sub-portion of the end effector 2 illustrated in FIG. 2*c* according to one or more embodiment of the present disclosure where the plurality of resilient members 15*a*, 15*b* are configured to non-permanently deform in a space 25 when adjacent holding tools 12*a*-12*c* are displaced relative to each other along the displacement axes AX1, AX2 by means of the linear actuators 10*a*-10*c* (only distal coupling parts 11*b* of the linear actuators 10 shown). The end effector 2 may be operable to manipulate the shape of a sheet 8, such as a sheet 8 lifted from an inventory surface 22, by displacing adjacent holding tools 12*a*-12*c* relative to each other while holding the sheet 8 with the holding tools 12*a*-12*c*, such as by continually providing lifting forces FL at one or more patches across the sheet 8.

In one or more embodiments of the present disclosure, the non-permanent deformation of a first resilient member 15*a* may provide a rotating force/torque FR around a first common pivot point, such as counterclockwise at the multiaxial joint 14 connected to the first holding tool 12*a*. The rotating force/torque FR may provide that the first holding tool 12*a* is rotated to adjust an orientation of the lifting surfaces 17 of the first holding tool 12*a* to an equilibrium orientation in response to deforming the first resilient member 15*a*. In further embodiments of the present disclosure, the non-permanent deformations of a first resilient member 15*a* and a second resilient member 15*b* may cancel out or balance two rotating force/torque FR (not shown) around a second common pivot point, such as with about equal magnitudes clockwise and counterclockwise at the multiaxial joint 14 connected to the second holding tool 12$b$. Two balancing rotating force/torque FR may provide that a second holding tool 12$b$ remains about at a level orientation. In yet further embodiments of the present disclosure, the non-permanent deformation of a second resilient member 15$b$ may provide a rotating force/torque FR around a third common pivot point, such as such as clockwise at the multiaxial joint 14 connected to the third holding tool 12$c$. The rotating force/torque FR may provide that the third holding tool 12$c$ is rotated to adjust an orientation of the lifting surfaces 17 of the third holding tool 12$c$ to an equilibrium orientation in response to deforming the first resilient member 15$b$. It is understood that rotating forces/torques FR may be provided during the non-permanent deformation of the resilient members 15$a$, 15$b$ until the lifting surfaces 17 of the holding tools 12$a$-12$c$ are at an equilibrium orientation.

Figure 3:
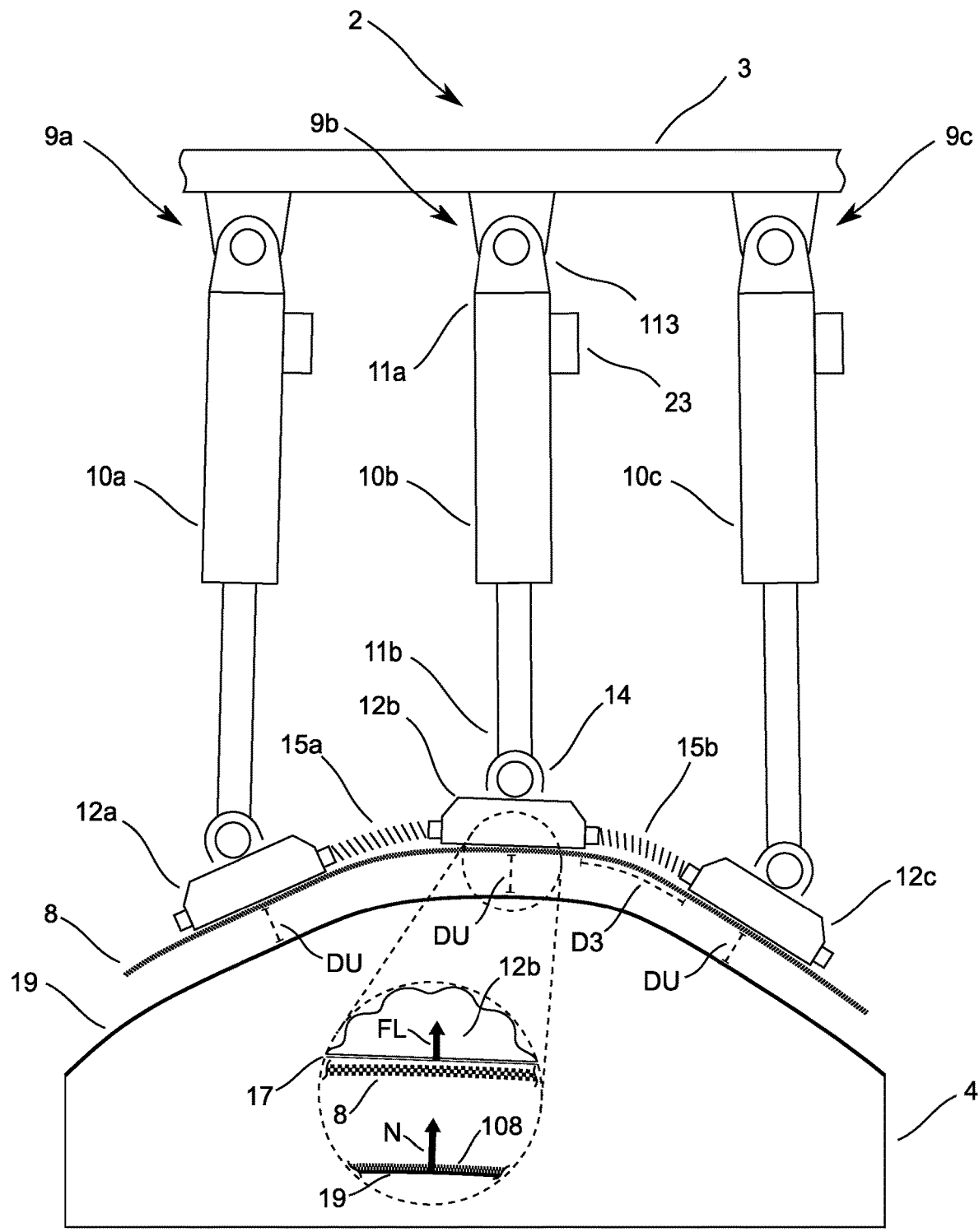
FIG. 3 illustrates a portion of an end effector according to further embodiments of the present disclosure comprising a plurality of manipulator assemblies and a plurality of resilient members deformed for pre-shaping a sheet.

FIG. 3 is a schematic illustration a portion of an end effector 2 such as illustrated in FIG. 1 according to the embodiment of the present disclosure with a plurality of manipulator assemblies 9$a$, 9$b$, 9$c$ and a plurality of resilient members 15$a$, 15$b$ non-permanently deformed for pre-shaping a sheet 8 according to a layup surface 19 of a draping mold 4.

The end effector 2 may be operable to pre-shape a sheet 8 of flexible material according to a layup surface 19 of a draping mold 4 by displacing the holding tools 12$a$-12$c$ to a set of relative positions via the linear actuators 10$a$-10$c$. The set of relative positions may be derived to provide that the pre-shaped sheet 8 is substantially uniformly separated from the layup surface 19 the holding tools 12$a$-12$c$ have been displaced along the displacement axes AX1, AX2 by means of the linear actuators 10$a$-10$c$ so as to pre-shape the sheet. Alternatively, the set of relative positions may be derived from a target shape, such as a minimum-curvature spline surface representing a smoothed shape of the layup surface 19, to provide an improved fitting of the shape of the sheet 8 to the shape of the layup surface 19.

In one or more embodiments of the present disclosure, pre-shaping a sheet 8 of flexible material may include displacing adjacent holding tools 12$a$-12$c$ relative to each other while holding the sheet 8 with the holding tools 12$a$-12$c$, such as by continually providing lifting forces FL at the lifting surfaces 17 in contact with the sheet 8.

The circular inset in FIG. 3 shows an enlarged cutout of a holding tool 12$b$ with a lifting surface 17 lifting and holding the pre-shaped sheet 8 while oriented at an equilibrium orientation. In further embodiments of the present disclosure, the pre-shaped sheet 8 may be fastened onto the layup surface 19 to form a workpiece 108. It is understood that the workpiece 108 may include one or more other sheets 8 of flexible material, which have been compacted or bonded together, or have been prepared to be compacted and bonded (more firmly) subsequently.

In one or more embodiments of the present disclosure, an orientation of the lifting surfaces 17 of the holding tools 12$a$-12$c$ may have been aligned to an equilibrium orientation in response to the resilient members 15$a$, 15$b$ deforming, as described in more details above, e.g. in relation to FIGS. 2$a$-2$d$. It is understood that such an equilibrium orientation of the lifting surfaces 17 of the holding tools 12$a$-12$c$ may provide that the holding tools 12$a$-12$c$ are aligned to and at rest at an orientation following the curvature of the layup surface 19, such as orientation wherein the lifting force FL provided at the lifting surface 17 is parallel to a surface normal N of the layup surface 19, as for example shown in the circular inset in FIG. 3.

In one or more embodiments of the present disclosure, the plurality of resilient members 15$a$-15$b$ may be configured to change a mutual distance D1 between opposing faces 24 of two adjacent holding tools 12$b$, 12$c$ in response to the displacement of the two adjacent holding tools 12$b$, 12$c$ relative to each other by means of the linear actuators 10$b$, 10$c$. In further embodiments of the present disclosure, the plurality of resilient members 15$a$-15$b$ may be configured to change a mutual distance D1 such that an arc length D3 along the resilient member 15$b$ is kept substantially constant when manipulating the sheet 8.

The end effector 2 may further be operable to fasten, by pushing, the sheet 8 of flexible material onto the layup surface 19, such as at a pre-determined orientation, via the holding tools 12$a$-12$c$ to form part of a workpiece 108. It is understood that a sheet 8 of flexible material may be pre-shaped and fastened in a single operation.

In one or more embodiments of the present disclosure, a pre-shaped sheet 8 may be fastened by being brought into contact with the layup surface 19 by displacing the holding tools 12$a$-12$c$ towards the layup surface 19. In further embodiments of the present disclosure, a pre-shaped sheet 8 may be fastened by pushing the sheet onto the layup surface 19 by means of a pushing force F1.

Figure 4A:
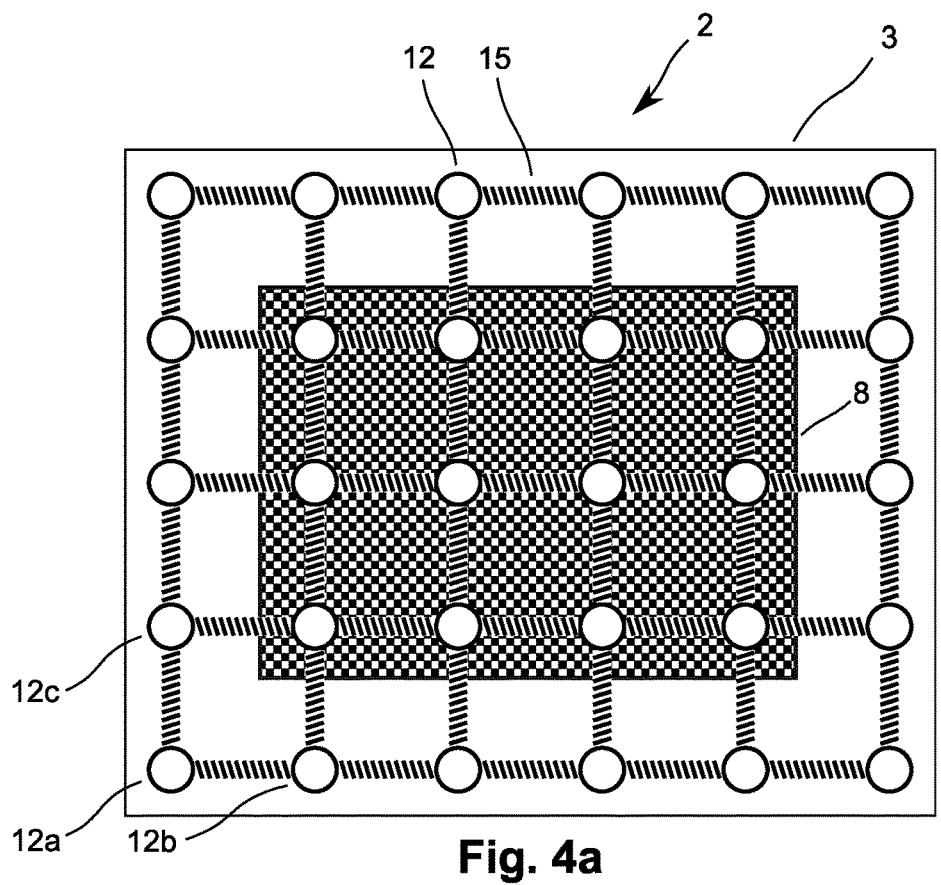
FIG. 4a illustrates a top, plan view of an end effector according to one or more embodiments of the present disclosure showing a plurality of holding tools arranged on a grid.
Figure 4B:
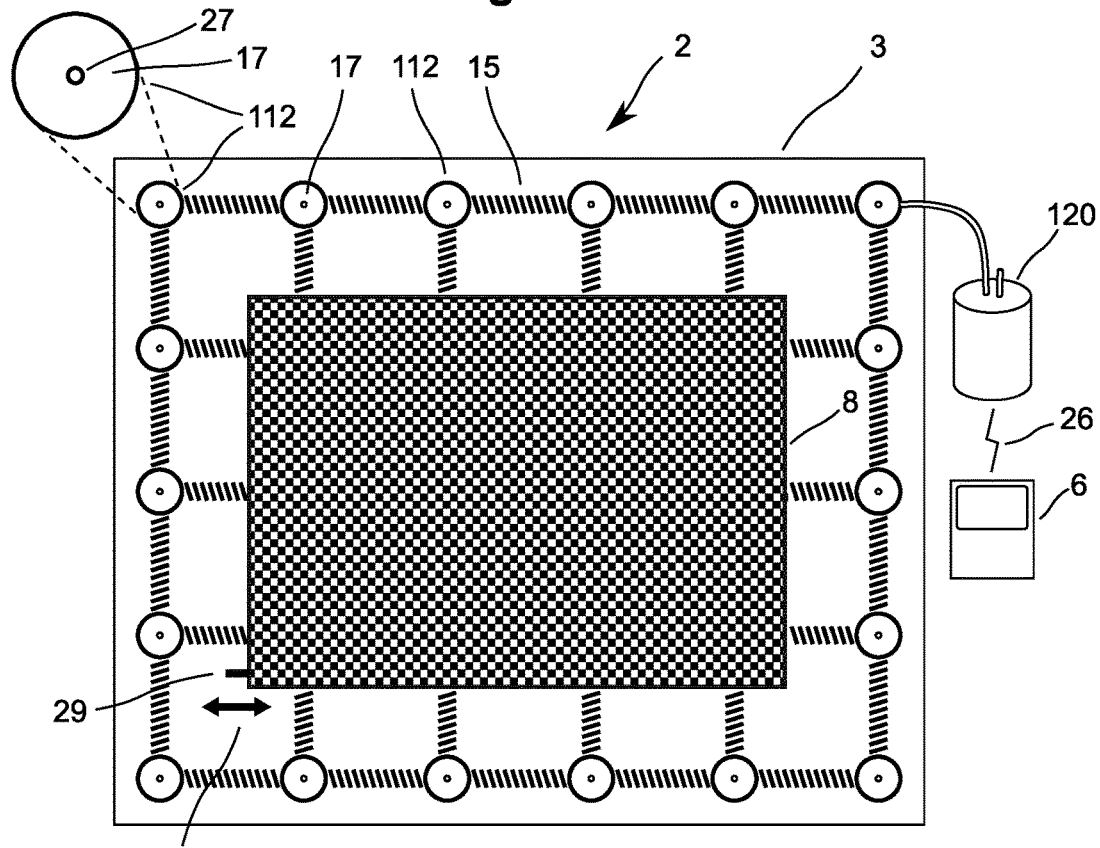
FIG. 4b illustrates a bottom, plan view of the end effector illustrated in FIG. 4a according to one or more embodiments of the present disclosure showing a lifting surface comprising one or more openings.

FIG. 4$a$ illustrates a top, plan view of an end effector 2 according to one or more embodiments of the present disclosure showing a plurality of holding tools 12$a$-12$c$ arranged on a grid. The end effector 2 may be operable to lift a sheet 8 which has been cut to a specific shape, such as rectangular shape, by positioning a plurality of holding tools 12$a$-12$c$ above the sheet 8 with the lifting surfaces 17 (not shown) pointed down towards the sheet 8 for providing lifting forces FL at the sheet 8 to lift and hold the sheet 8 into contact with the lifting surfaces 17. In one or more embodiments of the present disclosure, the plurality of holding tools 12$a$-12$c$ may be distributed about evenly across the specific shape of the sheet 8. In a further embodiment of the present disclosure, the holding tools 12, 12$a$-12$c$ may be arranged on a plurality of lattice points of a finite two-dimensional lattice with each lattice point occupied by one corresponding holding tool 12, 12$a$-12$c$.

In yet a further embodiment of the present disclosure, at least a subset of the plurality of holding tools 12$a$-12$c$ may be placed adjacent to a boundary of the specific shape of the sheet 8 to minimize drooping of the edges of the sheet 8 at the outermost regions, which are not supported between two adjacent holding tools 12$a$-12$c$. It is understood that adjacent 12$a$-12$c$ may not necessarily be placed on a straight line, such as a first holding tool 12$a$ being adjacent to a second holding tool 12$b$ and a third holding tool 12$c$, as is for example illustrated in FIG. 4$a$ at a substantially right-angled corner of the sheet 8.

FIG. 4$b$ illustrates a bottom, plan view of the end effector 2 illustrated in FIG. 4$a$ according to one or more embodiments of the present disclosure showing a lifting surface 17 including one or more openings 27. The end effector 2 may be operable to lift a sheet 8 by lifting surfaces 17 including one or more openings 27 configured for applying an airflow at the one or more openings 27 to generate a lifting force FL, such as with a suction cup. In one or more embodiments of the present disclosure, the lifting surfaces 17 may be provided at a lowermost face of holding tools 112 in the form of suction cups. In further embodiments of the present disclosure, the airflow applied at the one or more openings 27 may be a suction or partial vacuum to generate a lifting force FL by means of a vacuum generator 120. In yet further embodiments of the present disclosure, a controller 6 may be operable to transmit commands to a hardware processor at the vacuum generator 120 via a data communication link 26. Alternatively, the controller 6 may be configured to control a vacuum switch or valve such that the suction or partial vacuum generating the lifting force FL may be controlled, such as by switching the vacuum switch or valve between an on and an off state. The suction cups 112 may provide that sheets 8 of flexible material can be lifted at the lifting surfaces 17 substantially without any creasing, wrinkling or buckling of the sheet 8 by said flexible material being partially permeable to the airflow, such that the suction or partial vacuum provides sufficient lifting force FL to lift the sheet but not so much force so as to draw the sheet 8 into the one or more openings 27 and thereby damaging the sheet 8.

The end effector 2 may operable to orient a sheet 8 to a pre-determined orientation, such as a target orientation at a layup surface 19, by rotating the end effector 2 around an axis of rotation, such as vertical axis. In one or more embodiments of the present disclosure, the sheet 8 may include a plurality of fibers 29, such as carbon fiber mat. In further embodiments of the present disclosure, the plurality of fibers 29 may include at least one fiber direction 30. It is contemplated that such a sheet 8 may be oriented to a pre-determined orientation according to the layup surface 19 such that at least one fiber direction 30 is aligned to a target orientation at the layup surface 19.

In one or more embodiments of the present disclosure, rotating the end effector 2 may include first deriving a rotation angle for rotating the end effector 2 around an axis of rotation, such as by rotating the support frame 3 by means of a controllable mobile support mechanism 5. In further embodiments of the present disclosure, the rotation angle may be derived by first measuring at least one fiber direction 30 of the plurality of fibers 29 prior to orienting the sheet 8. The rotation angle may be derived from the at least one fiber direction 30 for orienting the sheet 8 according to the layup surface 19 substantially in parallel to at least one pre-determined direction.

Figure 5A:
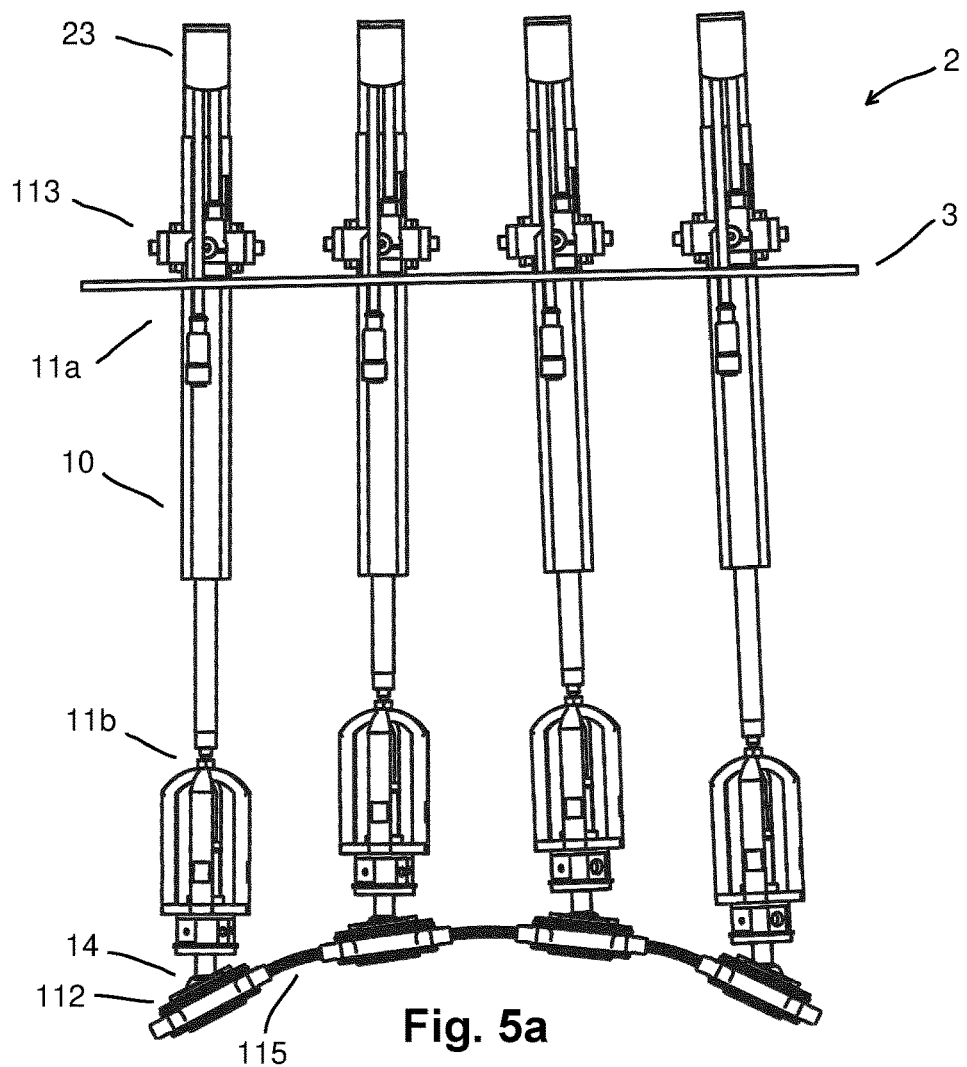
FIG. 5a illustrates a portion of an end effector according to one or more embodiments of the present disclosure with support mounts in the form of articulating support brackets and drives.

FIG. 5a illustrates a portion of an end effector according to one or more embodiments of the present disclosure with support mounts 113 in the form of articulating support brackets and drives 23 mounted above the proximal coupling parts 11a of the linear actuators 10 protruding above the support frame 3. The end effector 2 here comprises holding tools 112 in the form of suction cups and a plurality of resilient members 115 in the form of springs.

Figure 5B:
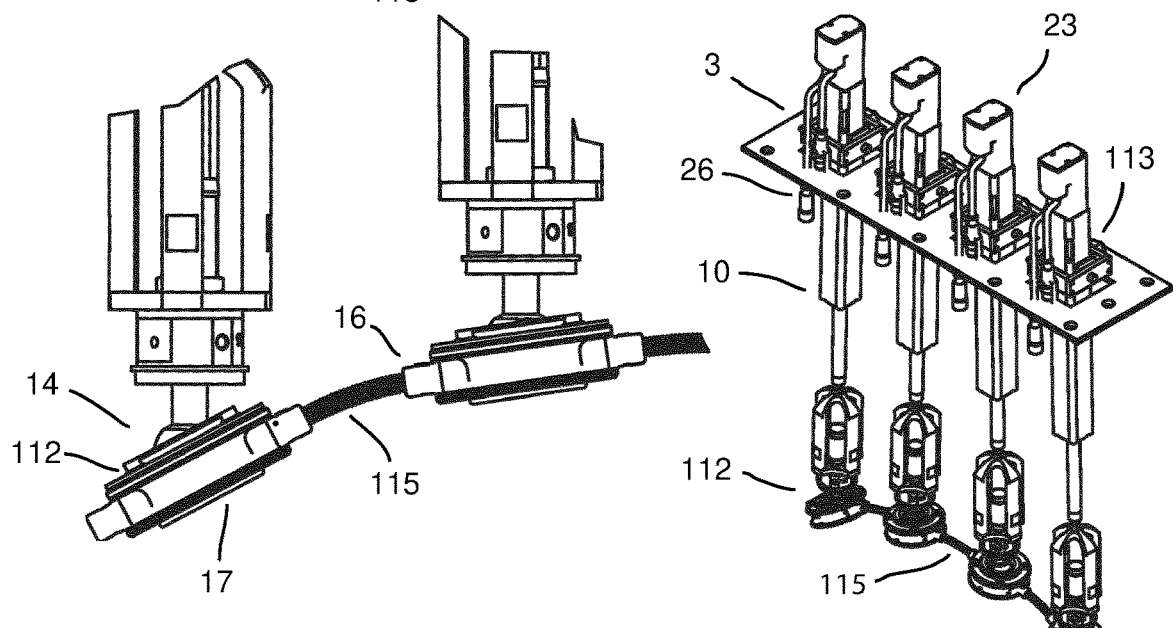
FIG. 5b illustrates a portion of an end effector illustrated in FIG. 5a showing an enlarged cutout of two adjacent holding tools in the form of suction cups according to further embodiments of the present disclosure.

FIG. 5b illustrates a portion of an end effector illustrated in FIG. 5a showing an enlarged cutout of two adjacent holding tools in the form of suction cups 112 according to further embodiments of the present disclosure. As described according to one or more embodiments above in relation to FIG. 5a, a resilient member 115 in the form of a spring is shown rigidly affixed between the two adjacent suction cups 112 by mounting braces 16. The suction cup 112 here comprises a cylindrical housing with a lifting surface 17, which is shown oriented to an equilibrium orientation by means of the deformation of the spring 115 in a space 25. In further embodiments of the present disclosure, the multi-axial joint 14 may be a ball joint including a ball stud protruding below a distal coupling part 11b of the linear actuator 10 and a corresponding socket integrated into the cylindrical housing of the suction cup 112. It is understood that the socket being integrated into the cylindrical housing of the suction cup 112 provides that a pivot point at the multiaxial joint 14 may be minimally separated from the lifting surface 17.

Figure 5C:
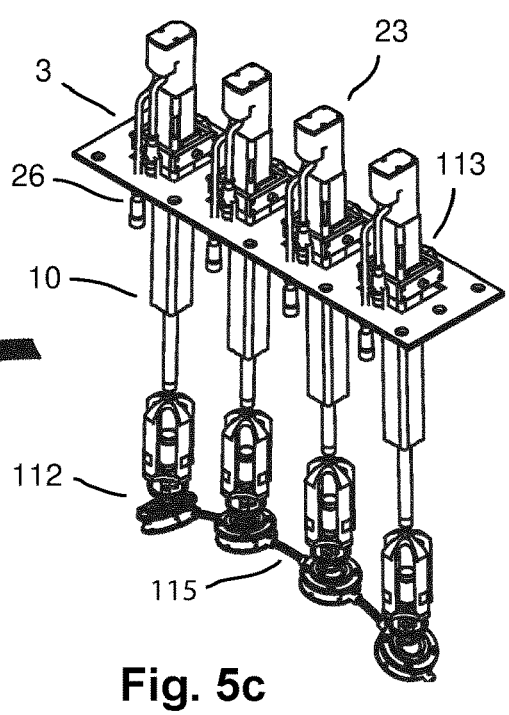
FIG. 5c illustrates a perspective view of a portion of an end effector according to one or more embodiments of the present disclosure showing linear actuators mounted on articulating support brackets and protruding through a support frame.

FIG. 5c illustrates a perspective view of a portion of an end effector according to one or more embodiments of the present disclosure showing linear actuators mounted on articulating support brackets 113 and protruding through a support frame 3 providing rotational freedom between the support frame 3 and each linear actuator 10. The end effector 2 here includes resilient members 115 in the form of springs, which are shown deformed in spaces 25 along a common spline curve. The drives 23 here comprise a communication link 26 for connecting a controller 6 (not shown).

It is generally to be understood that the proximate coupling part 11a is connected to the housing or the like of the linear actuator 10 by means of the articulating support mount 13 in order to allow a rotational movement and/or linear movement relative to the frame 3 when the pushing rod to which the holding tool 12 is connected (at the distal coupling part or end) is displaced in the longitudinal direction of the linear actuator relative to the housing of the linear actuator and the frame 3.

FIGS. 5a and 5c illustrates a further embodiment of the present disclosure where a housing part of the linear actuator 10 is connected to the support mount 13 at a proximate coupling part 11a. Here it is clear that the proximate coupling part 11a may not necessarily be connected to/at the end of the housing of the linear actuator 10 furthest away from the holding tool 12 as illustrated in one or more of the above-described figures. Instead, as illustrated in FIGS. 5a and 5c, the linear actuator 10 may in further embodiments of the present disclosure be connected to the articulating support bracket 113 at a proximate coupling part 11a placed any suitable location along the linear actuator 10 such as at any suitable location along the housing (or rail or the like) of the linear actuator, in order to provide the articulating jointing between the linear actuator 10 and the support frame 3.

In the embodiment of FIGS. 5a and 5c, the support mount is located about ⅓ of the length of the housing of the linear actuator from the end of the housing distal to the holding tool 12, but it is generally understood that it may in further embodiments of the present disclosure be located at a position of the housing between 0% and 100%, such as between ⅛ and ⅞ of the length of the housing measured from the end of the housing distal to the holding tool.

Figure 6A:
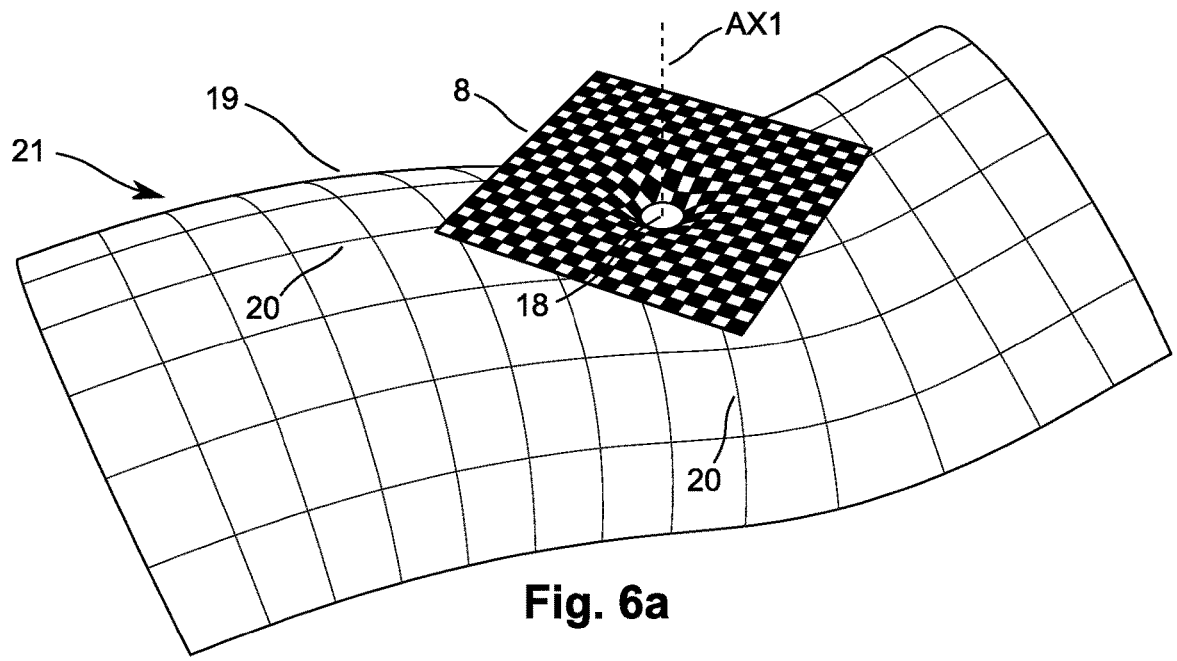
FIG. 6a is a perspective illustration of a sheet of flexible material contacting a curved layup surface by means of displacing a holding tool according to one or more embodiments of the present disclosure.

FIG. 6a is a perspective illustration of a sheet 8 of flexible material contacting a curved layup surface 19 by means of displacing a holding tool 12 according to one or more embodiments of the present disclosure. The layup surface 19 may be represented by a spline surface 21, such as a minimum-curvature spline surface, which interpolates a plurality of spline curve 20 representing the collective deformation of a plurality of resilient member 15, such as when the sheet 8 has been pre-shaped according to the layup surface 19 of a draping mold 4 via the holding tools 12. In FIG. 6a, two splines curves 20 are shown intersecting at a point near the point of intersection of the displacement axis AX1 with the spline surface 21. A pre-shaped sheet 8 is shown above the spline surface 21 being pushed onto the layup surface 19, such as by the displacement of a holding tool 12 along the displacement axis AX1 towards the layup surface 19, with the sheet 8 contacting the layup surface 19 at least at one patch 18.

Figure 6B:
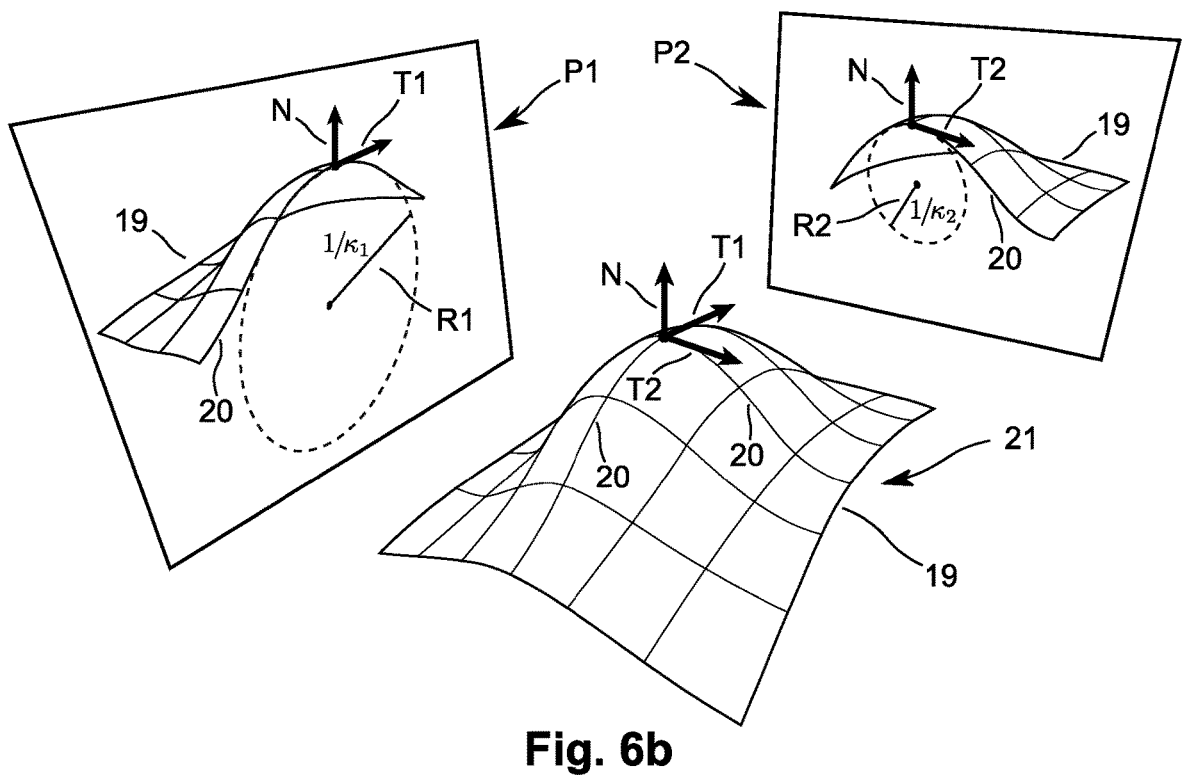
FIG. 6b is a perspective illustration of a curved layup surface with a surface normal and principal radii of curvature at a point on the layup surface according to embodiments of the present disclosure.

FIG. 6b is a perspective illustration of a curved layup surface 19 with a surface normal N and principal radii of curvature R1, R2 at a point on the layup surface 19 according to embodiments of the present disclosure. The layup surface 19 here is configured to curve with a first principal radius of curvature R1 at a point on the layup surface 19, having a surface normal N and surface tangents T1, T2, along a first normal section P1 defined by a plane spanned by the surface normal N and a first surface tangent T1 intersecting the layup surface 19. It is understood that, by the layup surface 19 having a first principal radius of curvature R1, a first circle with radius equal to the first principal radius of curvature R1 may be positioned tangent to the point on the layup surface 19 as shown in the first normal section P1 to match the curvature of the layup surface 19 along the first surface tangent T1. In further embodiments of the present disclosure, the layup surface 19 may further be configured to doubly curve with a first principal radius of curvature R1 as described above and a second principal radius of curvature R2 at the same point on the layup surface 19 along a second normal section P2 similarly defined by the surface normal N and a second surface tangent T2. It is likewise understood that, by the layup surface 19 having a second principal radius of curvature R2, a second circle with radius equal to the second principal radius of curvature R2 may be positioned tangent to the point on the layup surface 19 as shown in the second normal section P2 to match the curvature of the layup surface 19 along the second surface tangent T2.

An end effector 2 according embodiments of the present disclosure may be able to smoothly drape a sheet 8 of flexible material onto at least a part of a curved layup surface 19, such as a conical surface, a cylindrical surface or a ruled surface, wherein the principal radii of curvature R1, R2 are numerically greater than 10 cm at all points on the layup surface 19, such as numerically greater than 12 cm, such as numerically greater than 15 cm, and wherein at least one of the principal radii of curvature R1, R2 is numerically less than 3 m at least at one point on the layup surface 19, such as numerically less than 1 m, such as numerically less than 50 cm, such as numerically less than 30 cm. Particularly, by a plurality of resilient members 15 connecting holding tools 12 arranged on a regular grid and/or in a repeating pattern as described according to one or more embodiments in relation to FIGS. 4a-4b, such an end effector 2 may be able to smoothly drape at sheet 8 of flexible material onto at least a part of a doubly curved layup surface 19 having two principal radii of curvature R1, R2 at least at one point on the layup surface 19, such as a hemisphere, such as an elliptic paraboloid, such as a hyperbolic paraboloid, such as a freeform surface.

Figure 7:
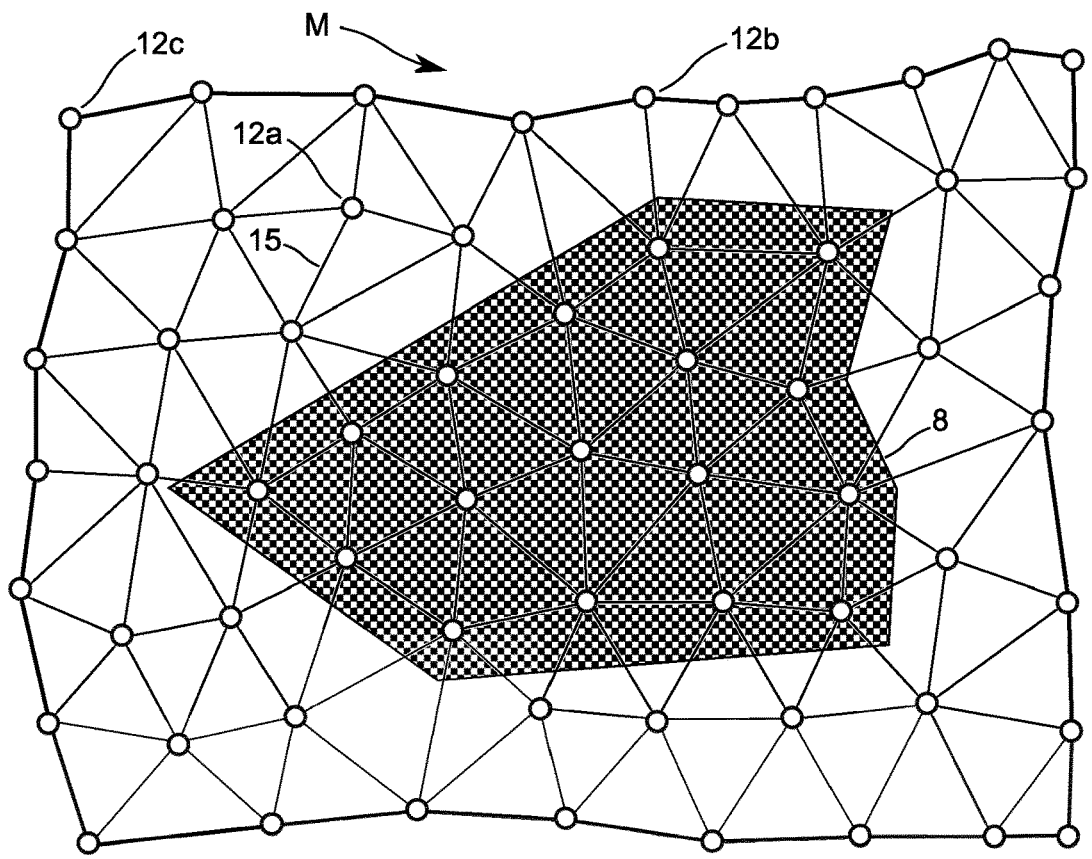
FIG. 7 illustrates a top, plan view of an end effector according to one or more embodiments of the present disclosure showing a plurality of holding tools connected by a plurality of resilient members to form a polygon mesh.

FIG. 7 illustrates a top, plan view of an end effector 2 according to one or more embodiments of the present disclosure showing a plurality of holding tools 12a-12c connected by a plurality of resilient members 15 to form a polygon mesh M, such as for lifting a sheet 8 of flexible material having a polygon shape. The polygon mesh M has an interior and a boundary, with the boundary including a plurality of corners, and comprises a plurality of nodal points with a holding tool 12 positioned at each nodal point. In one or more embodiments of the present disclosure, the polygon mesh M may be formed by holding tools 12a at the interior being connected to at least four adjacent holding tools 12a-12c by the plurality of resilient members 15. It is understood that each corners of the boundary of the polygon mesh M may have either an obtuse or acute interior angle, depending on whether the interior angle is above or below 90°, respectively. In further embodiments of the present disclosure, the polygon mesh M may further be formed by holding tools 12b at the plurality of corners with acute interior angles being connected to at least three adjacent holding tools 12a-12c by the plurality of resilient members 15 and by holding tools 12c at the plurality of corners with obtuse interior angles being connected to at least two adjacent holding tools 12a-12c by the plurality of resilient members 15. Such an arrangement provides that at least a subset of the plurality of holding tools 12a-12c may be placed adjacent to a boundary of the polygon shape of the sheet 8 to minimize drooping of the edges of the sheet 8 at the outermost regions, which are not supported between two adjacent holding tools 12a-12c.

Figure 8:
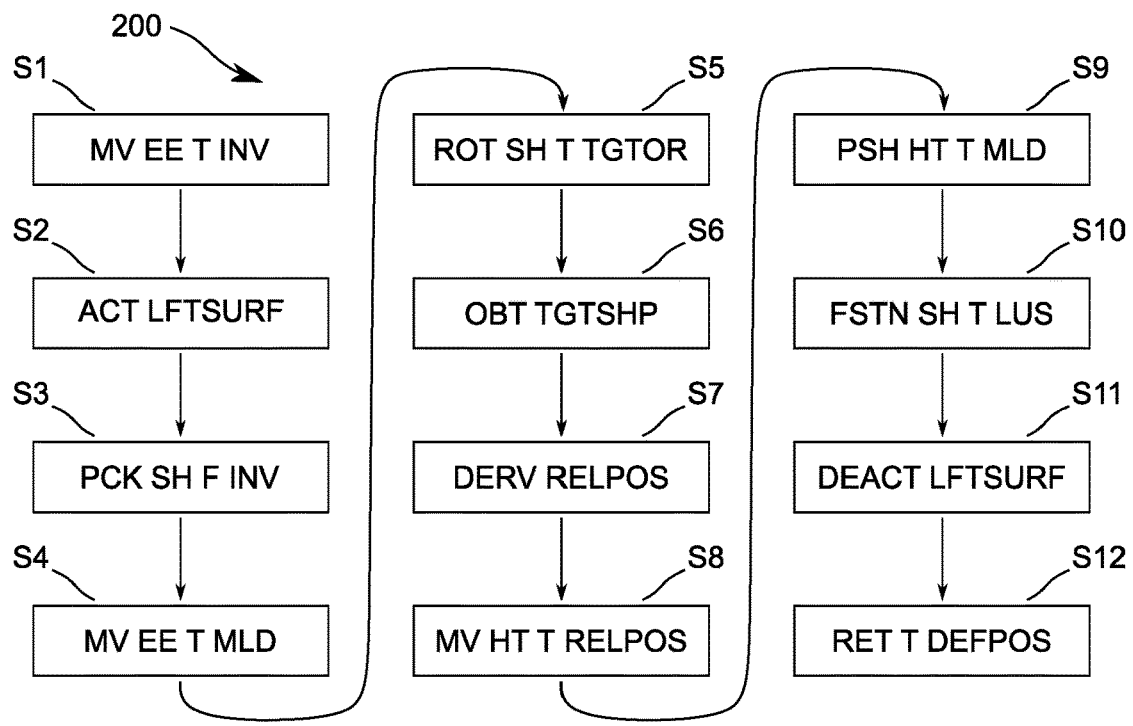
FIG. 8 illustrates a method of operating an end effector according to one or more embodiments of the present disclosure.

FIG. 8 illustrates a method of operating an end effector 2 according to one or more embodiments of the present disclosure. In a first step S1, the end effector 2 is moved to an inventory surface 22, such as by a controller 6 enabling a controllable mobile support mechanism 5 to move the support frame 3. In a second step S2, subsequent to the first step S1, the lifting surfaces 17 are activated, such as by a controller 6 enabling a vacuum generator 120 to provide a suction or partial vacuum at one or more openings 27 at the lifting surfaces 27. In a third step S3, a sheet 8 of flexible material is lifted from the inventory surface 22, such as by holding the lifting surfaces 17 in contact with the sheet 8. In a fourth step S4, the end effector 2 is moved to a draping mold 4 having a layup surface 19, such as by a controller 6 enabling a controllable mobile support mechanism 5 to move the support frame 3. In a fifth step S5, the lifted sheet 8 is oriented to a pre-determined orientation according to a layup surface 19 by means of a controllable mobile support mechanism 5, such as controller 6 enabling the controllable mobile support mechanism 5 to rotate the support frame 3. In a sixth step S6, a target shape of the layup surface 19 is obtained, such as a measured shape or a minimum-curvature spline representation of the layup surface 19. In a seventh step S7, a set of relative positions is derived based on the target shape, such as by look-up in a table. In an eight step S8, the holding tools 12, 12a-12c are moved to the set of relative positions via the linear actuators 10, 10a-10c such that the sheet 8 is pre-shaped according to the target shape. In a ninth step S9, the holding tools 12, 12a-12c are displaced towards the layup surface 19 of the draping mold 4. At a tenth step S10, the pre-shaped sheet 8 is pushed onto the layup surface 19 by a pushing force F1 to fasten the sheet 8 at the pre-determined orientation. At an eleventh step S11, the lifting surfaces 17 are deactivated, such as by a controller 6 disabling a vacuum generator 120. At a twelfth step S12, the linear actuators 10, 10a-10c and the support frame 3 may be returned to a default position.

In a further embodiment of the present disclosure, the method may further includes carrying out steps S1-S12 in multiple sequences or iterations, wherein the twelfth step S12 in a first iteration is followed by the first step S1 in a second iteration and so forth, such as for lifting, orienting and fastening at least one other sheet 8 of flexible material onto a previously fastened sheet 8 to form part of a workpiece 108.

While the present disclosure has been described in detail in connection with only a limited number of embodiments or aspects, it should be readily understood that the present disclosure is not limited to such disclosed embodiments or aspects. Rather, the present disclosure can be modified to incorporate any number of variations, alterations, substitutions or equivalent arrangements not heretofore described, but which are commensurate in scope with the present disclosure. Additionally, while various embodiments or aspects of the present disclosure have been described, it is to be understood that aspects of the present disclosure may include only some of the described embodiments or aspects or combinations of the various embodiments or aspects.

Accordingly, the present disclosure is not to be seen as limited by the foregoing description.

| References | |
|---|---|
| 1 | Apparatus |
| 2 | End effector |
| 3 | Support frame |
| 4 | Draping mold |
| 5 | Controllable mobile support mechanism |
| 6 | Controller |
| 7 | Optical sensor |
| 8 | Sheet |
| 9, 9a-9c | Manipulator assembly |
| 10, 10a-10c | Linear actuator |
| 11a | Proximal coupling part |
| 11b | Distal coupling part |
| 12, 12a-12c | Holding tool |
| 13 | Support mount |
| 14 | Multiaxial joint |
| 15, 15a-15b | Resilient member |
| 16 | Mounting brace |
| 17 | Lifting surface |
| 18 | Patch |
| 19 | Layup surface |
| 20 | Spline curve |
| 21 | Spline surface |
| 22 | Inventory surface |
| 23 | Drive |
| 24 | Opposing face |
| 25 | Space |
| 26 | Communication link |
| 27 | Openings |
| 28 | Locking device |
| 29 | Fiber |
| 30 | Fiber direction |
| 108 | Workpiece |
| 112 | Suction cup |
| 113 | Articulating support bracket |
| 115 | Spring |
| 120 | Vacuum generator |
| 200 | Method |
| AX1, AX2 | Displacement axis |
| D1 | Mutual distance |
| D2 | Actuated distance |
| D3 | Arc length |
| DU | Uniform distance |
| F1 | Pushing force |
| F2 | Pulling force |
| FL | Lifting force |
| FR | Rotating force/torque |
| M | Polygon mesh |
| N | Surface normal |
| P1 | First normal section |
| P2 | Second normal section |
| R1 | First principal radius of curvature |
| R2 | Second principal radius of curvature |
| S1-S10 | Step |
| T1 | First surface tangent |
| T2 | Second surface tangent |

The invention claimed is:

1. An end effector for handling of a sheet of flexible material, to be applied onto a layup surface defined by a draping mold, wherein the end effector comprises:
   a support frame;
   a plurality of manipulator assemblies, each attached to the support frame by a respective support mount, wherein each of the plurality of manipulator assemblies comprises:
      a holding tool comprising a lifting surface, wherein the holding tool is configured for lifting a sheet;
      a linear actuator comprising a proximate coupling part connected to the support mount and a distal coupling part connected to the holding tool such that the holding tool is configured to be displaced along a displacement axis by means of the linear actuator, wherein the linear actuator is configured to apply a pushing force at the distal coupling part;
      a multiaxial joint, wherein the holding tool is connected to the linear actuator by the multiaxial joint; and
      a drive for providing the displacement of the holding tool by means of the linear actuator,
   wherein the end effector further comprises:
      a plurality of resilient members each rigidly affixed to two adjacent holding tools of the plurality of manipulator assemblies and positioned in a space providing a mutual distance between opposing faces of the two adjacent holding tools,
      wherein each holding tool is connected to at least two adjacent holding tools by means of the plurality of resilient members, and
      wherein the plurality of resilient members are configured to non-permanently deform in the space when adjacent holding tools are displaced relative to each other along their respective displacement axes by means of the linear actuators of the plurality of manipulator assemblies and to adjust, by rotating, an orientation of the lifting surfaces of the holding tools of the plurality of manipulator assemblies to an equilibrium orientation in response to deforming.

2. The end effector according to claim 1, wherein the plurality of resilient members are springs.

3. The end effector according to claim 2, wherein the springs are coil springs.

4. The end effector according to claim 1, wherein the rigidly affixing of each of the plurality of resilient members to the holding tools comprises mounting braces, each mounting brace comprising a receiving recess into which an end part of a respective resilient member is positioned so as to rigidly affix the end part of the respective resilient member.

5. The end effector according to claim 1, wherein each support mount is an articulating support bracket configured for providing at least one positional and/or rotational degree of freedom between the support frame and a respective linear actuator.

6. The end effector according to claim 5, wherein the plurality of resilient members are further configured to change the mutual distance between opposing faces of the two adjacent holding tools in response to the displacement of respective holding tools by means of the respective linear actuators.

7. The end effector according to claim 1, wherein each support mount is an articulating support bracket configured for providing at least two rotational degrees of freedom between the support frame and the respective linear actuator.

8. The end effector according to claim 1, wherein each multiaxial joint is configured for providing at least two rotational degrees of freedom between a respective linear actuator and a respective holding tool.

9. The end effector according to claim 1, wherein the plurality of resilient members are further configured to resist a perturbation to an orientation of the lifting surfaces of the holding tools away from an equilibrium orientation.

10. The end effector according to claim 1, wherein each of the plurality of resilient members is configured to non-permanently deform by bending along a spline curve with non-zero curvature in the space between the two adjacent holding tools.

11. The end effector according to claim 1, wherein each linear actuator comprises a sensor configured for providing positional feedback of an actuated distance for position control of the distal coupling part of the respective linear actuator.

12. The end effector according to claim 1, wherein the non-permanent deformation of each of the plurality of resilient members, comprising a first end rigidly affixed to a first holding tool and a second end rigidly affixed to a second holding tool, includes bending to rotate the first end together with the first holding tool and the second end together with the second holding tool, such that the first end rotates a substantially equal amount around a first common pivot point at the first holding tool and the second end rotates a substantially equal amount around a second common pivot point at the second holding tool, wherein the first common pivot point is at a multiaxial joint of the first holding tool and the second common pivot point is at a multiaxial joint of the second holding tool.

13. The end effector according to claim 1, wherein each holding tool comprises at least two mounting braces for rigidly affixing the plurality of resilient members.

14. A system for handling of a sheet of flexible material, the system comprising:
 a controllable mobile support mechanism;
 a controller; and
 an end effector comprising:
  a support frame;
  a plurality of manipulator assemblies, each attached to the support frame by a respective support mount, wherein each of the plurality of manipulator assemblies comprises:
   a holding tool comprising a lifting surface, wherein the holding tool is configured for lifting a sheet;
   a linear actuator comprising a proximate coupling part connected to the support mount and a distal coupling part connected to the holding tool such that the holding tool is configured to be displaced along a displacement axis by means of the linear actuator, wherein the linear actuator is configured to apply a pushing force at the distal coupling part;
   a multiaxial joint, wherein the holding tool is connected to the linear actuator by the multiaxial joint; and
   a drive for providing the displacement of the holding tool by means of the linear actuator,
  wherein the end effector further comprises:
   a plurality of resilient members each rigidly affixed to two adjacent holding tools of the plurality of manipulator assemblies and positioned in a space providing a mutual distance between opposing faces of the two adjacent holding tools,
  wherein each holding tool of the plurality of manipulator assemblies is connected to at least two adjacent holding tools by means of the plurality of resilient members, and
  wherein the plurality of resilient members are configured to non-permanently deform in the space when adjacent holding tools are displaced relative to each other along their respective displacement axes by means of the linear actuators of the plurality of manipulator assemblies and to adjust, by rotating, an orientation of the lifting surfaces of the holding tools of the plurality of manipulator assemblies to an equilibrium orientation in response to deforming, and
 wherein the end effector is mounted on the controllable mobile support mechanism and wherein the controller comprises a hardware processor for controlling the end effector and the controllable mobile support mechanism, either automatically, or as a result of user interaction by means of a user interface.

15. The system according to claim 14, wherein the linear actuators are configured to move the holding tools for pre-shaping the sheet according to a draping mold, comprising a layup surface, and to fasten, by pushing, the sheet onto the layup surface by means of the pushing force, wherein pre-shaping the sheet according to the layup surface of the draping mold includes fitting a shape of the sheet to a shape of the layup surface.

16. The system according to according to claim 15, wherein each respective linear actuator is configured to fasten, by pushing, the sheet onto the layup surface with each respective linear actuator, by each respective drive actuating each respective linear actuator towards the layup surface with the pushing force being greater in magnitude than a minimum compaction force required to fasten the sheet onto the layup surface.

17. A method of operating an end effector, the method comprising:
 providing an end effector, the end effector comprising:
  a support frame;
  a plurality of manipulator assemblies, each attached to the support frame by a respective support mount, wherein each of the plurality of manipulator assemblies comprises:
   a holding tool comprising a lifting surface, wherein the holding tool is configured for lifting a sheet;
   a linear actuator comprising a proximate coupling part connected to the support mount and a distal coupling part connected to the holding tool such that the holding tool is configured to be displaced along a displacement axis by means of the linear actuator, wherein the linear actuator is configured to apply a pushing force at the distal coupling part;
   a multiaxial joint, wherein the holding tool is connected to the linear actuator by the multiaxial joint; and
   a drive for providing the displacement of the holding tool by means of the linear actuator,
  wherein the end effector further comprises:
   a plurality of resilient members each rigidly affixed to two adjacent holding tools of the plurality of manipulator assemblies and positioned in a space providing a mutual distance between opposing faces of the two adjacent holding tools,
  wherein each holding tool of the plurality of manipulator assemblies is connected to at least two adjacent holding tools by means of the plurality of resilient members, and
  wherein the plurality of resilient members are configured to non-permanently deform in the space when adjacent holding tools are displaced relative to each other along their respective displacement axes by means of the linear actuators of the plurality of manipulator assemblies and to adjust, by rotating, an orientation of the lifting surfaces of the holding tools of the plurality of manipulator assemblies to an equilibrium orientation in response to deforming;
 the method further comprising:
  lifting a sheet from an inventory surface by holding the lifting surfaces in contact with the sheet;
  orienting the lifted sheet to a pre-determined orientation according to a layup surface by means of a controllable mobile support mechanism,
  deriving a set of relative positions based on a target shape;

moving the holding tools of the plurality of manipulator assemblies to the set of relative positions via the linear actuators of the plurality of manipulator assemblies such that the sheet is pre-shaped according to the target shape, thereby adapting the lifting surfaces according to the layup surface by the non-permanent deformation of at least a subgroup of the plurality of resilient members, without contacting the layup surface; and fastening, by pushing, the pre-shaped sheet onto the layup surface at the pre-determined orientation via the holding tools of the plurality of manipulator assemblies to form part of a workpiece.

18. The method according to claim 17, wherein moving the holding tools of the plurality of manipulator assemblies to the set of relative positions comprises displacing the holding tools of the plurality of manipulator assemblies along their respective displacement axes towards a substantially uniform distance from the layup surface by means of the respective linear actuators, such that the pre-shaped sheet is substantially uniformly separated from the layup surface.

19. The method according to claim 18, wherein fastening, by pushing, the sheet onto the layup surface comprises lowering the holding tools of the plurality of manipulator assemblies towards the layup surface from the substantially uniform distance by means of the respective linear actuators by:

displacing a first holding tool along its displacement axis towards the layup surface until the sheet is contacting the layup surface at a first patch;

subsequent to displacing the first holding tool, displacing one or more adjacent holding tools along their respective displacement axes towards the layup surface until the sheet is contacting the layup surface at the first patch and one or more second patches, wherein the one or more adjacent holding tools are adjacent to the first holding tool;

subsequent to displacing the one or more adjacent holding tools, displacing one or more semi-adjacent holding tools along their respective displacement axes towards the layup surface until the sheet is contacting the layup surface at the first patch, the one or more second patches and one or more third patches, wherein the one or more semi-adjacent holding tools are semi-adjacent to the first holding tool and adjacent to the one or more adjacent holding tools; and subsequent to displacing the one or more adjacent holding tools, displacing one or more other holding tools along their respective displacement axes towards the layup surface until the sheet is contacting the layup surface at each of the first, the one or more second patches, the one or more third patches below the first holding tool, the one or more adjacent holding tools, and the one or more semi-adjacent holding tools.

20. The method according to claim 17, wherein the sheet comprises a carbon fiber mat.

* * * * *